US011270415B2

(12) United States Patent
Barnes et al.

(10) Patent No.: US 11,270,415 B2
(45) Date of Patent: Mar. 8, 2022

(54) IMAGE INPAINTING WITH GEOMETRIC AND PHOTOMETRIC TRANSFORMATIONS

(71) Applicant: Adobe Inc., San Jose, CA (US)

(72) Inventors: Connelly Barnes, Seattle, WA (US); Sohrab Amirghodsi, Seattle, WA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 54 days.

(21) Appl. No.: 16/548,498

(22) Filed: Aug. 22, 2019

(65) Prior Publication Data
US 2021/0056668 A1 Feb. 25, 2021

(51) Int. Cl.
*G06T 5/00* (2006.01)
*G06T 7/33* (2017.01)
*G06T 5/50* (2006.01)

(52) U.S. Cl.
CPC ............... *G06T 5/005* (2013.01); *G06T 5/50* (2013.01); *G06T 7/33* (2017.01); *G06T 2207/10024* (2013.01); *G06T 2207/20021* (2013.01); *G06T 2207/20221* (2013.01)

(58) Field of Classification Search
CPC .. G06T 5/005; G06T 7/33; G06T 5/50; G06T 2207/10024; G06T 2207/20021; G06T 2207/20221; G06T 5/008; G06T 5/009; G06T 2200/32; G06T 2207/20092; G06T 2207/20104; G06T 7/30; G06T 11/60; H04N 1/3872
USPC ........................................................ 382/165
See application file for complete search history.

(56) References Cited

U.S. PATENT DOCUMENTS

| | | | |
|---|---|---|---|
| 4,925,294 | A | 5/1990 | Geshwind et al. |
| 6,133,946 | A | 10/2000 | Cavallaro et al. |
| 6,441,846 | B1 | 8/2002 | Carlbom et al. |
| 7,418,131 | B2 | 8/2008 | Wang et al. |
| 7,856,055 | B2 | 12/2010 | Zhou et al. |
| 8,121,347 | B2 | 2/2012 | Metaxas et al. |
| 8,249,299 | B1 | 8/2012 | Dhawan et al. |
| 8,615,111 | B2 | 12/2013 | Garten |

(Continued)

OTHER PUBLICATIONS

Lowe, David G., "Distinctive Image Features from Scale-Invariant Keypoints", 2004, Internal Journal of Computer Vision, 28 pages.

(Continued)

*Primary Examiner* — Amandeep Saini
(74) *Attorney, Agent, or Firm* — Finch & Maloney PLLC

(57) ABSTRACT

Techniques are disclosed for filling or otherwise replacing a target region of a primary image with a corresponding region of an auxiliary image. The filling or replacing can be done with an overlay (no subtractive process need be run on the primary image). Because the primary and auxiliary images may not be aligned, both geometric and photometric transformations are applied to the primary and/or auxiliary images. For instance, a geometric transformation of the auxiliary image is performed, to better align features of the auxiliary image with corresponding features of the primary image. Also, a photometric transformation of the auxiliary image is performed, to better match color of one or more pixels of the auxiliary image with color of corresponding one or more pixels of the primary image. The corresponding region of the transformed auxiliary image is then copied and overlaid on the target region of the primary image.

20 Claims, 11 Drawing Sheets

(56) References Cited

U.S. PATENT DOCUMENTS

| | | |
|---|---|---|
| 8,620,029 B2 | 12/2013 | Dhawan et al. |
| 9,087,402 B2 | 7/2015 | Doolittle |
| 9,641,818 B1 | 5/2017 | Sharma et al. |
| 9,697,595 B2 | 7/2017 | Bedi et al. |
| 10,264,230 B2 | 4/2019 | Sharma et al. |
| 10,467,739 B2 | 11/2019 | Bedi et al. |
| 2005/0129324 A1 | 6/2005 | Lemke |
| 2006/0192867 A1 | 8/2006 | Yosefin |
| 2007/0031003 A1 | 2/2007 | Cremers |
| 2007/0097268 A1 | 5/2007 | Relan et al. |
| 2007/0250898 A1 | 10/2007 | Scanlon et al. |
| 2010/0027961 A1 | 2/2010 | Gentile et al. |
| 2010/0296748 A1 | 11/2010 | Shechtman et al. |
| 2011/0050864 A1 | 3/2011 | Bond |
| 2011/0091127 A1 | 4/2011 | Kisilev et al. |
| 2012/0051429 A1 | 3/2012 | Kim et al. |
| 2012/0092357 A1 | 4/2012 | Wang et al. |
| 2012/0213404 A1 | 8/2012 | Steiner |
| 2013/0021368 A1 | 1/2013 | Lee et al. |
| 2013/0051685 A1 | 2/2013 | Shechtman et al. |
| 2013/0156339 A1* | 6/2013 | Hayata ............... G06T 5/002 382/268 |
| 2014/0169667 A1 | 6/2014 | Xiong et al. |
| 2015/0156468 A1 | 6/2015 | Moriguchi et al. |
| 2015/0297949 A1 | 10/2015 | Aman et al. |
| 2018/0350085 A1* | 12/2018 | Lu ............... G06T 11/60 |
| 2019/0005631 A1* | 1/2019 | Shiga ............... G06T 5/009 |

OTHER PUBLICATIONS

Hartmann W., et al., "Predicting Matchability", 2014, CVRP2014, 8 pages.

Xu, W. and J. Mulligan, "Panoramic video stitching from commodity HDTV cameras", Multimedia Systems, (2013) 19: 407. https://doi.org/10.1007/s00530-013-0316-2, 9 pages.

Kim, J. et al., "Deformable Spatial Pyramid Matching for Fast Dense Correspondences", 2013, CVRP2013, 8 pages.

Perez, P. et al., "Poisson Image Editing", 2003, AMC, pp. 313-318.

Baker, S. and I. Matthews, "Lucas-Kanade 20 Years On: A Unifying Framework", 2004, International Journal of Computer Vision, vol. 56, pp. 221-255.

Whyte, O., et al., "Get Out of my Picture! Internet-based Inpainting", 2009, 11 pages.

Huang, JJ, et al., "Photo Realistic Image Completion via Dense Correspondence", IEEE Transactions on Image Processing, Nov. 2018, vol. 27, pp. 5234-5247.

Criminisi, et al., "Region Filling and Object Removal by Exemplar-Based Image Inpainting", IEEE Transactions on Image Processing, vol. 13, No. 9, pp. 1-13 (Sep. 2004).

Tomasi, et al., "Detection and Tracking of Point Features", Carnegie Mellon University Technical Report CMU-CS-91-132 (Apr. 1991).

\* cited by examiner

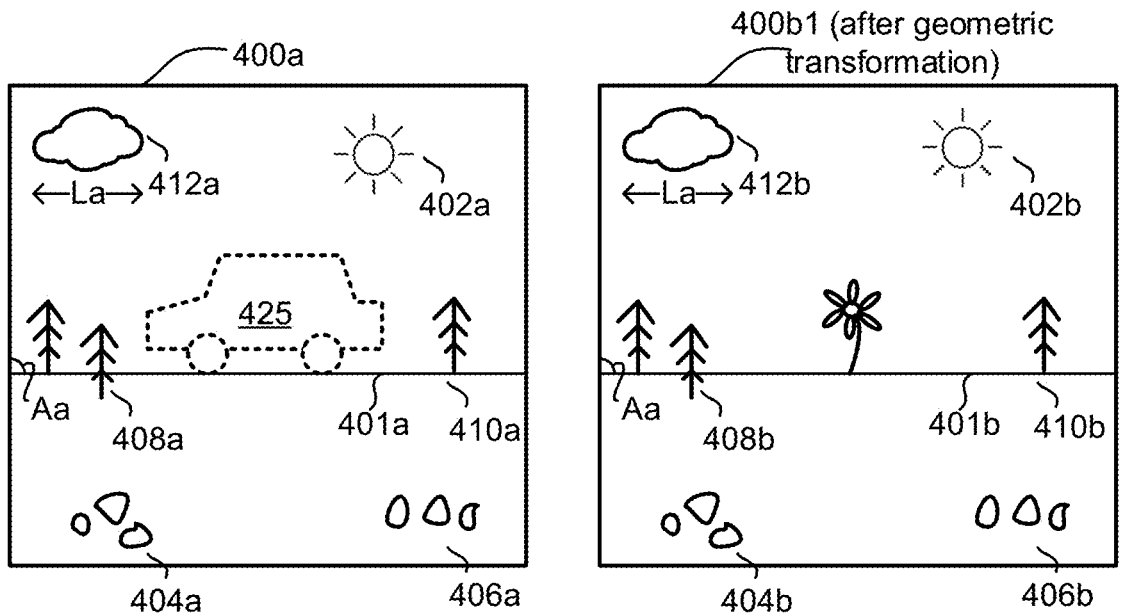
FIG. 4C
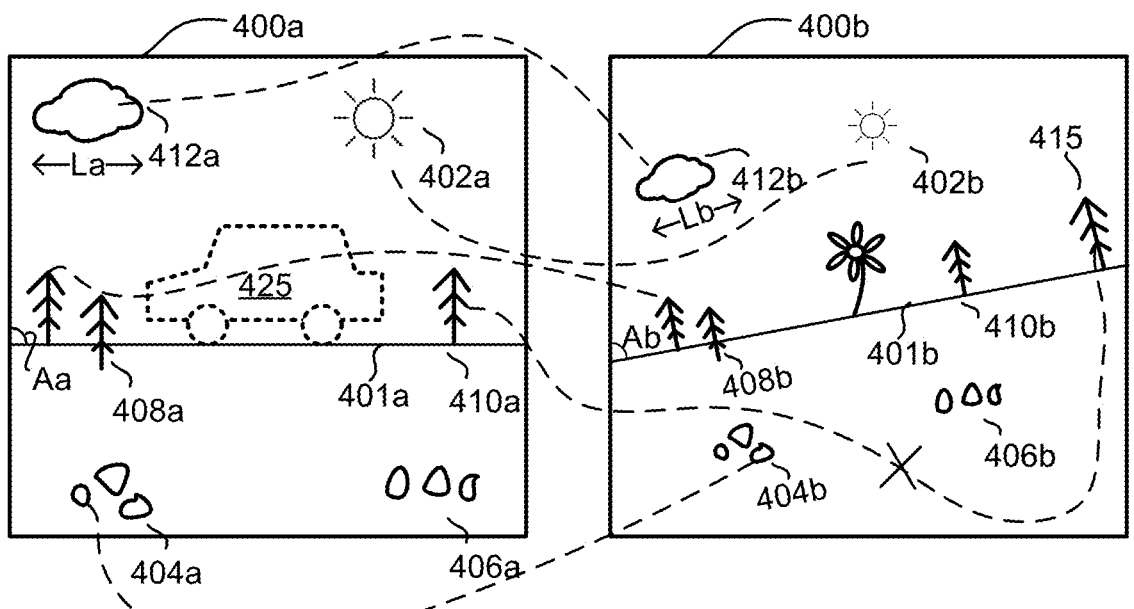
FIG. 4C1

FIG. 4C2

FIG. 5A
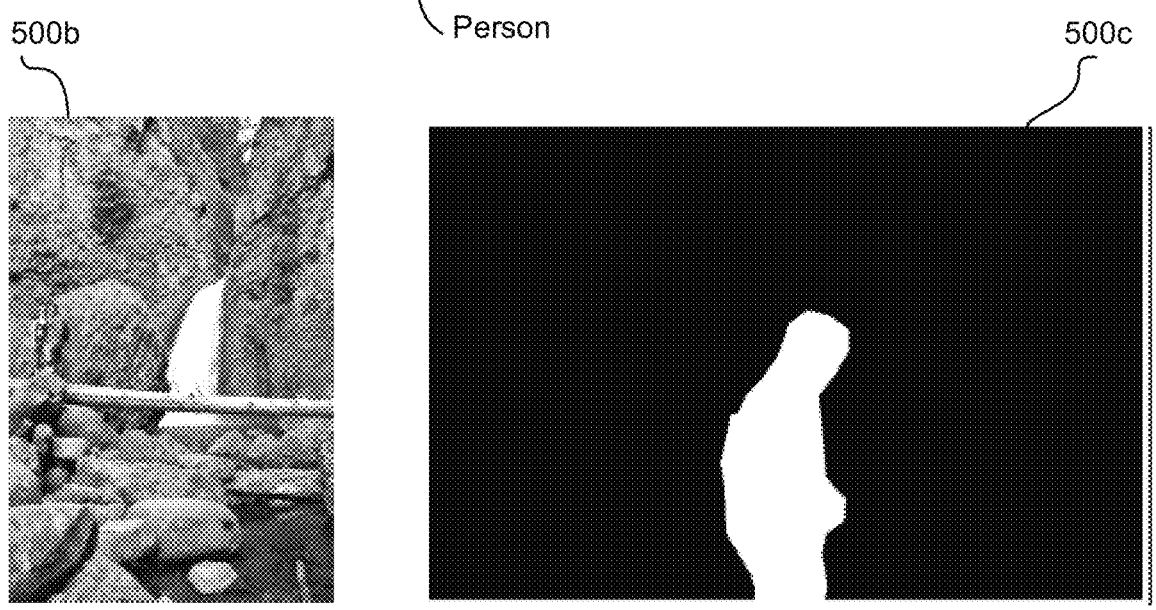
FIG. 5B
FIG. 5C
FIG. 5D

IMAGE INPAINTING WITH GEOMETRIC AND PHOTOMETRIC TRANSFORMATIONS

FIELD OF THE DISCLOSURE

This disclosure relates generally to digital image processing, and more specifically to techniques for effectively replacing a selected region of a given image with a corresponding region of an auxiliary image.

BACKGROUND

The increased prevalence and technical capabilities of cameras, including those included in smartphones, have dramatically increased the ease with which people can capture digital photographs and videos. Parallelly, image processing has undergone tremendous advancement in the last few decades, and image processing can be used to alter or modify images captured by the cameras.

BRIEF SUMMARY

Introduced here are techniques/technologies for filling or otherwise replacing a target region of a primary image with a corresponding region of an auxiliary image. For example, the target region of the primary image can have an unwanted object, such as a bystander or a car, in front of a background scene. The corresponding region of the auxiliary image can show the background scene without being blocked by the unwanted object. In such a scenario, the unwanted object can be effectively removed from the primary image, e.g., by copying and overlaying the corresponding region of the background scene from the auxiliary image on the undesired object of the primary image.

In some embodiments, because the primary and auxiliary images may not be geometrically and/or photometrically aligned, geometric and/or photometric transformations are applied to the primary and/or auxiliary images. For instance, in one example embodiment, a geometric transformation of the auxiliary image is performed, to geometrically align the auxiliary image with the primary image. Also, a photometric transformation of the auxiliary image is performed, to better match color of one or more pixels of the auxiliary image with color of corresponding one or more pixels of the primary image. The corresponding region of the transformed auxiliary image is then transferred to the target region of the primary image.

BRIEF DESCRIPTION OF THE DRAWINGS

FIGS. 4A, 4B, 4C, 4C1, 4C2, 4D, 4E, 4F, 4G, 4H, and 4I illustrate primary and auxiliary images depicting various stages of an image inpainting process, in accordance with some embodiments of the present disclosure.

FIGS. 5A-5D illustrate example images, where an object from a primary image is effectively replaced by a background from an auxiliary image, in accordance with some embodiments of the present disclosure.

DETAILED DESCRIPTION

Figure 1:
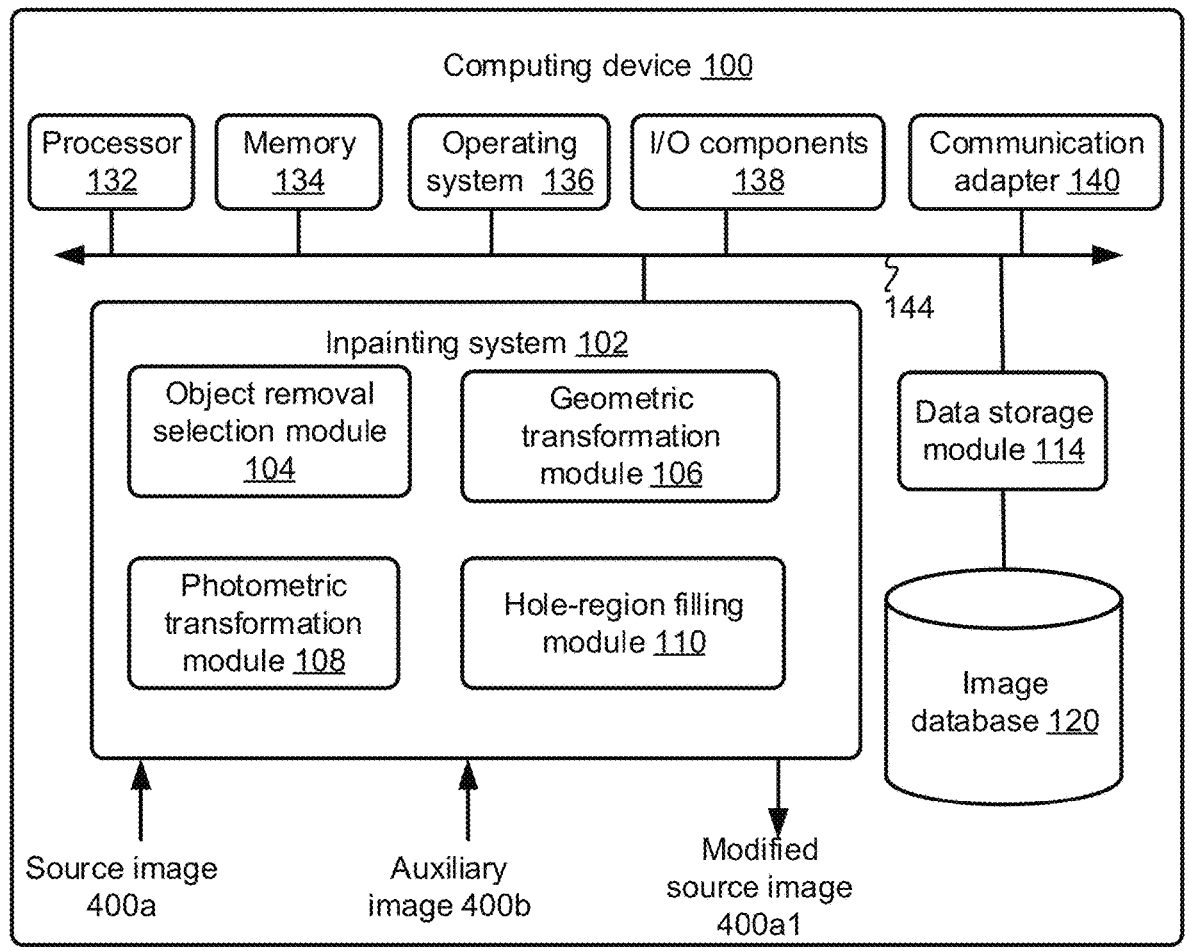
FIG. 1 is a block diagram schematically illustrating selected components of an example computing device configured to provide an image inpainting service to effectively replace a selected region of a primary image with a corresponding region of an auxiliary image, in accordance with an embodiment of the present disclosure.

Techniques are disclosed for filling or otherwise replacing a target region of a primary image with a corresponding region of an auxiliary image. Note that the filling or replacing can be done with an overlay, such that no actual subtractive process need be run on the primary image. In other words, the corresponding region of the auxiliary image can be copied onto the target region of the primary image, without actually removing the target region. Alternatively, the target region can be cut out or otherwise actually removed, prior to pasting the corresponding region of the auxiliary image into the target region of the primary image. In any case, because the primary and auxiliary images may not be aligned, both geometric and photometric transformations are applied to the primary and/or auxiliary images, prior to transferring the corresponding region of the auxiliary image to the target region of the primary image. For instance, in one example embodiment, a geometric transformation of the auxiliary image is performed, to better align fine-scale features (e.g., edges, contours, corners, and/or deep features) of the auxiliary image with corresponding features of the primary image. In an embodiment, this geometric transformation is performed initially to coarsely align the auxiliary image with the primary image, and then is further refined to better align the fine-scale features of the auxiliary image. Also, a photometric transformation of the auxiliary image is performed, to better match color of one or more pixels of the auxiliary image with color of corresponding one or more pixels of the primary image. The corresponding region of the transformed auxiliary image is then transferred to the target region of the primary image.

General Overview

Often times, a user captures, using one or more cameras, multiple images of a same scene. In an example, a first image captured by the user has an unwanted object, such as a bystander or a car, in front of a background scene. The user may want to remove such an object from the first image, such as the example case where the bystander or the car in front of the background scene is undesirable to the user. The user may have also captured a second image that shows the background scene without being blocked by the unwanted object, but is deficient in some other way. In such a scenario, the unwanted object can be effectively removed from the first image by copying and overlaying a corresponding region of the background scene from the second image on the undesired object of the first image. This process is generally referred to herein as an "image inpainting" process. As will be appreciated in light of this disclosure and explained in turn, there exists a number of non-trivial issues associated with image inpainting techniques. For example, the two images may have been captured from different camera positions and angles, and/or with different lighting conditions. That is, the second image can be geometrically and/or photometrically different from the first image in a relatively significant manner. Thus, without corrective actions as variously described herein, mere copying and pasting from the second image to the first image is likely to make the end product of the image inpainting process visually noticeable and undesirable to the user.

As noted above, there exists a number of non-trivial issues associated with existing image inpainting techniques. For example, the one or more auxiliary images being used to source the fill content, as well as the primary image receiving the fill content, may all have been captured from different camera positions and angles, and/or with different lighting conditions and/or camera settings. As an example, the camera may undergo lateral, vertical, and/or rotational movement, and/or a change in zoom level (scale) between capturing the various images being used in the image inpainting process.

For ease of reference, the image receiving the fill content is referred to herein as the primary image, and the one or more images sourcing the fill content are referred to herein as auxiliary images. To simplify further discussion, and without loss of generality, a reference to "an auxiliary image" or "the auxiliary image" can imply any of one or more auxiliary images. For example, where two such auxiliary images are available, the image inpainting techniques discussed herein can be performed using a first auxiliary image to replace a region of the primary image to generate a first modified primary image, and the image inpainting technique can be repeated using a second auxiliary image to replace the region of the primary image to generate a second modified primary image. Then a better of the first or second modified primary images can be selected as the final modified image. The selection can be performed by an appropriate algorithm, and/or by a human.

In general, the auxiliary image at the pixel level might be geometrically not aligned to the primary image (i.e., the edges of features within the primary and auxiliary images may not be sufficiently aligned with one another). In addition to (or instead of) such geometric variations between the primary and auxiliary images, there may be photometric variations between the primary and auxiliary images. For example, lighting conditions, exposure, color, and white balancing may be different between the primary image and the auxiliary image. In this manner, the auxiliary image is photometrically distinct from the primary image (i.e., the colors of the primary and auxiliary images do not sufficiently match).

In an embodiment of the present disclosure, such geometric and/or photometric differences between the primary and auxiliary images are corrected, prior to copying a region of an auxiliary image onto or otherwise over the corresponding region of the primary image. Without such correction, the copying and pasting can potentially produce a readily detectable (and therefore undesirable) mismatch between the copied section of an auxiliary image and surrounding sections of the primary image.

To correct such geometric and/or photometric differences between the primary and auxiliary images, in some example embodiments, the auxiliary image can be transformed prior to copying the region of interest to the primary image. For example, the auxiliary image is geometrically transformed, such as by performing affine transformation or a homographic (also known as perspective or projective) transformation of the auxiliary image. Such transformations help align the scale (zoom level) and corresponding edges of the auxiliary image to the primary image. Examples of affine transformations include scaling (e.g., uniform and/or non-uniform scaling), rotation, and translation (e.g., lateral and/or vertical movement). The affine transformations are a subset of the homographic transformations. Homographic transformation additionally includes perspective projection terms—these can be thought of as transformations that modify initially parallel lines to be non-parallel, and these can be helpful for modeling the projective process that occurs in real-world cameras. These transformations geometrically align or otherwise sufficiently match the auxiliary image to the primary image. Note that, in some embodiments, such geometric transformation can be performed initially to coarsely align the auxiliary image with the primary image, and then subsequently refined to better align the fine-scale features of the auxiliary image. Although the fine-scale features used for alignment can vary from one embodiment to the next, in some such cases the fine-scale features that are used in the alignment include one or more edges or contours, one or more corners, one or more deep features, and/or any other consistently recognizable feature.

As will be appreciated, a deep feature is any detectable feature or pattern that causes a consistent response (inference) of a node or layer within a hierarchical deep learning model, wherein that response is relevant to a final output of the model. A feature is considered "deeper" than another depending on how early in the decision tree or other framework of the model that the response is triggered. In more detail, in a neural network designed for image classification, the given neural network model can be trained on a set of training images and thus learns to respond when certain features are encountered. Intermediate layers can be trained to identify more general features, such as an edge detector layer or a contour detector layer, while the final or last layers can be trained to detect very specific features such as a face having eyes and a mouth. In this way, the deeper layers effectively narrow down the choices to be made by the later (less-deep) layers. This is powerful, because the less-deep layers of a standard trained neural network can indeed identify a specific feature such as a car, but they may not be able discern the difference, for instance, between a car and another similar looking block-like object. So the deeper layers can cull out block-like objects that are not cars. Thus, such standard deep feature detection can be helpful, according to some embodiments where the geometric transformation and/or photometric transformation are implemented using one or more trained neural networks, as will be discussed in turn.

Note that the alignment or match need not be perfect, so long as the alignment or match is sufficient to provide a visually pleasing result (the pasted portion of the auxiliary image will not be readily detectable as an obviously-copied patch), as will be appreciated. Thus, a threshold or degree of variation can be tolerated, according to some embodiments. In one example use case, after the alignment, an object (such as a rock) of the primary image aligns or maps to (e.g., similar in shape, size, location, and perspective) a corresponding object (the same rock) in the auxiliary image. In one such example case, in addition to performing the geometric transformation, the auxiliary image is also subjected to photometric transformation to align the colors of the auxiliary image to the colors of the primary image. For example, after such a photometric transformation, color information (e.g., red, green and blue channel color information) of a pixel of an object in the primary image is sufficiently similar to color information of a corresponding pixel of a corresponding object in the auxiliary image. Again, note that an exact color match is not required, so long as the result is visually pleasing (where any difference in color is not human-perceptible, or is otherwise negligible such that the pasted portion of the auxiliary image will not be readily detectable as a patch).

In some embodiments, to implement the geometric and/or photometric transformations of the auxiliary image, various sparse features in the primary and auxiliary images are identified. A sparse feature in an image can be readily distinguished from its surrounding pixels. In particular, a sparse feature has unique pixel signatures or values relative to the surrounding pixels, such that these features can be easily identified. In an example embodiment, these features may be, for instance, darker or brighter, or of a different color, than the surrounding area in the image. For example, a blurry region of green grass among a relatively large expanse of a green lawn in an image is not easily distinguishable, and thus is not a sparse feature. But a brown rock in that same expanse of green lawn, or the yellow-orange sun in the blue sky are easily distinguishable. Hence, the rock and the sun can be identified as sparse features.

The geometric and photometric transformations may be carried out in a number of ways. In some embodiments, prior to applying any transformations, a plurality of features in the primary image are matched with a corresponding plurality of features in the auxiliary image, to generate a corresponding plurality of pairs of matched features. For example, a first feature (e.g., a rock) of the primary image is matched with a corresponding first feature (e.g., the rock) of the auxiliary image, to provide a first matched pair of features. Similarly, a second feature (e.g., a tree) of the primary image is matched with a corresponding second feature (e.g., the tree) of the auxiliary image, to provide a second pair of matched features. As will be appreciated, a feature of the primary image and a corresponding feature of the auxiliary image form a pair of matched features due to similarities (e.g., similar pixel color information, size, location in the image, shape, and edges) between these two features. In an example, for each feature in the primary and/or auxiliary images, a corresponding descriptor of the feature is generated, where the descriptor includes information indicating a position of the feature in the image, pixel color information of the feature, size and shape of the feature, edges of the feature, and/or other information derived from the feature. In an example, feature descriptors of various features of the two images are compared to find the matching feature pairs in the two images. Note that two features in a matched feature pair need not match exactly, as the primary image may be geometrically and/or photometrically distinct from the auxiliary image, and hence, the matched features are not expected to be exactly same in shape, size, color, and location.

Subsequently, a first subset (e.g., some, but not all) of matched feature pairs of the plurality of matched feature pairs are selected randomly, or based on some pre-established criteria (e.g., sparse objects that are relatively large are selected over sparse objects that are relatively small). For example, an appropriate RANdom SAmple Consensus algorithm, or "RANSAC" algorithm, is used for the selection. One or more geometric transformations are selected and performed, that aim to align the selected matched feature pairs. As variously discussed, the determined geometric transformations may include, for example, one or more of rotation, scaling, vertical and/or lateral translation, and perspective distortion. For example, if a selected first matched feature pair includes a first feature from the primary image and a first feature from the auxiliary image, and if a selected second matched feature pair includes a second feature from the primary image and a second feature from the auxiliary image, then the geometric transformations aim to align the first and second features from the primary image with the respective first and second features from the auxiliary image. Subsequently, a score is generated that indicates the quality of the transformed matches. The score can be a function of, for example, how evenly the selected matched feature pairs are distributed throughout the image, how close the selected matched feature pairs are to the region to be filled, and/or the geometric transformations performed. If the score is less than a threshold, the process is repeated. For example, if the score is less than the threshold, a second subset of matched feature pairs of the plurality of matched feature pairs are selected randomly, one or more geometric transformations are selected and performed, and another score is generated. This process continues until a termination condition has been satisfied. Examples of the termination condition include the score being sufficiently high (e.g., higher than the threshold) and/or performance of at least a threshold number of iterations, according to an embodiment. These termination conditions indicate that the auxiliary image has been geometrically transformed to sufficiently align with the primary image. Thus, now shape, size, and location of a feature of the primary image sufficiently or generally match with those of a corresponding matched feature of the auxiliary image, although there may still be a few pixel-level differences or misalignments between the two images. Note that such possible relatively slight misalignment may be acceptable for purposes of the expected quality of the image inpainting process. Alternatively, if the degree of misalignment is not acceptable, this may be later cured or otherwise reduced by refining the geometric transformation, as will be discussed in turn.

Although random selection of the matched feature pairs of the plurality of matched feature pairs are discussed herein above, in some embodiments, the selection need not be random. Furthermore, the plurality of matched feature pairs is discussed herein to be sparse features in some examples, above, in some embodiments, the features can also include dense points or dense features, e.g., the features may be densely located at one or more pixels, or even at every or most pixels of the images.

Subsequent to performing the geometric transformation, global photometric transformation of the auxiliary image is performed. Note that in other embodiments, photometric transformation may be carried out before geometric transformation. In still other embodiments, the photometric and geometric transformations can be performed in an alternating fashion where one or both initially performed photometric and geometric transformations are subsequently refined on either global or local scales, as will be discussed in turn. In an example embodiment, the global photometric transformation is performed to compensate for changes in exposure, lighting condition, white balance, and illumination between the primary and auxiliary images. This photometric correction is referred to as "global" as the photometric correction is performed in the same manner throughout the auxiliary image (and not confined to a local area of the auxiliary image). The geometric transformation may be similarly applied in a global fashion. The photometric correction involves changing pixel color (e.g., red (R), green (G) and/or blue (B) color information of individual pixels) of the auxiliary image such that color of a feature of the auxiliary image sufficiently matches color of a corresponding feature of the primary image.

As an example, color information of a first feature (e.g., R, G, B color information of pixels of the first feature) of the primary image is compared to color information of a corresponding feature of the auxiliary image. All or at least some of the matched feature pairs are considered during such color comparison. Such comparisons are used to generate gain values $\alpha_R$, $\alpha_G$, and/or $\alpha_B$ for the R, G, and/or B channels, respectively, and to calculate bias values $\beta_R$, $\beta_G$, and/or $\beta_B$ for the R, G, and/or B channels, respectively, where these values sufficiently align or otherwise fit the colors of the features of the primary image to the corresponding features of the auxiliary image. Note that sufficient alignment can be measured by a pre-established threshold difference, such as the case where a match is declared if the gain and bias values are within 10% of one another, or within 5% of a target value, or some other suitable threshold for measuring whether or not a match is sufficiently similar. The color correction is then applied globally to all pixels of the auxiliary image, based on the calculated gain and bias values.

In some embodiments, subsequent to the global photometric transformation, the previously performed geometric transformation is refined or fine-tuned to improve pixel-level alignment. For example, the geometric transformation performed previously may roughly align the auxiliary image to the primary image (e.g., to meet the threshold requirement). But there may still be misalignment between the two images, e.g., by a few pixels. The refinement aims to further reduce or eliminate such misalignment between the two images. In some such example embodiments, the geometric transformation is refined by placing higher weight on edges of various features, such as those edges that are relatively straight or have a definite shape. In an example, to refine the geometric transformation, edge map of either of the two images (or edge maps of both the two images) can be generated, where the edge map indicates edges of various features. The pixels on the edge maps are then weighted higher than pixels elsewhere in the images. Subsequently, a geometric transformation is calculated that maximizes alignment of pixel colors as weighted by an edge map. For example, the geometric transformation is calculated that minimizes an energy function that is based on the colors as weighted by an edge map.

In more detail and according to an example embodiment, the geometric transformation and the refinement of the auxiliary image may be excessive, e.g., the auxiliary image may be too distorted to generate an alignment between the primary and auxiliary images. In some embodiments, to avoid such excessive distortion, an energy function is modified to add a penalty for too much distortion (e.g., to add a penalty for too much skew, too much non-uniform scaling, and/or the like). For example, if certain types of distortion (e.g., skew, or non-uniform scaling) during the geometric transformation is beyond a threshold, the geometric transformation algorithm is modified to add the penalty, such that such excessive distortion is avoided or reduced while calculating the geometric transformation and/or its refinement.

In some embodiments, subsequent to the initial geometric transformation and the refinement of the geometric transformation, the primary image and the auxiliary image are substantially geometrically aligned. Also, the global photometric correction photometrically matches the auxiliary image to the primary image, within a given threshold. However, there may still be some color mismatch between the two images. Accordingly, a local photometric or color correction of the auxiliary image can be performed, to further align colors of the auxiliary image at, near and/or inside the corresponding region in the primary image. To perform such local photometric correction, pixels at or near (e.g., within a threshold distance, such as within a one-pixel distance, two-pixel distance, or higher) the boundary of the region to be replaced in the primary image, and corresponding pixels in the corresponding region of the auxiliary image are compared, and a color map adjustment mask is generated. For ease of discussion, the region to be replaced in the primary image may be referred to herein as a hole-region, as in the hole to be filled. However, this terminology is not intended to implicate limitation on the present disclosure. For instance, the use of hole-region does not necessarily mean that a portion of the primary image has been actually removed so as to create a hole, nor that the hole needs to be connected (e.g. the hole could consist of multiple disconnected regions). Rather, the hole-region simply refers to one or more portions of the primary image that are to be filled, replaced or covered with a corresponding portion of an auxiliary image. In some embodiments, prior to generating the color map adjustment mask, the pixels at or near a boundary of a given hole-region are blurred (e.g., to account for geometric mis-alignment of the primary and auxiliary images by a few pixels). If the color map adjustment mask is higher than a threshold, this implies that there is a larger color mismatch between a pixel of the primary image and a corresponding pixel of the auxiliary image near the hole-region. This may happen if, for example, an object which is not in the primary image is present in the auxiliary image (or an object which is not in the auxiliary image is present in the primary image). For example, because the primary and auxiliary images are taken in two different instances of time (and/or taken from different locations), a person or other object may be near the hole-region in one image and may not be present in another image. Because of the pixel values attributed to the pixels of the person or object in one of the images, the color map adjustment mask for those pixels will be higher than the threshold for those pixels. Accordingly, if the color map adjustment masks for some pixels are higher than the threshold, the color map adjustment masks are ignored for those pixels, when performing the local color correction.

In some embodiments, after the generation of the color map adjustment mask for various pixels at or near a boundary of the hole-region, a difference image for various pixels at or near a boundary of the hole-region is generated. Subsequently, the difference images are used to perform local color correction of pixels inside the hole-region in the auxiliary image.

Thus, now the auxiliary image geometrically and photometrically sufficiently matches the primary image, within pre-established similarity thresholds. The primary region has the hole-region that has to be filled with the corresponding region from the auxiliary image. The region in the auxiliary image, which corresponds to the hole-region of the primary image, is then copied and overlaid on the hole-region of the primary image. Because the auxiliary image has been geometrically and photometrically transformed to align with the primary image, filling the hole-region of the primary image with the corresponding region of the auxiliary image is relatively seamless. For example, the filled in region of the primary image visually appears to be a part of the original primary image, and the fill operation may thus be visually undetectable or otherwise imperceptible to the average human eye, thereby leading to a better content fill operation and a better user experience. Numerous variations and embodiments will be appreciated in light of this disclosure.

System Architecture

FIG. 1 is a block diagram schematically illustrating selected components of an example computing device 100 (also referred to as device 100) configured to provide image inpainting service to effectively replace a selected region of a primary image with a corresponding region of an auxiliary image, in accordance with some embodiments. As can be seen, the device 100 includes an image inpainting system 102 (also referred to as image fill system), which allows users to remove an unwanted object from a digital image. In some embodiments, the process of removing the unwanted object from the digital image involves identifying the object to be removed from the image, removing the pixels that form the unwanted object, and filling in a resulting hole-region with a visually plausible background. In still other embodiments, the hole-region that includes the unwanted object is identified without actually removing the pixels that form the unwanted object. In such cases, filling in the hole-region involves covering the underlying pixels of the unwanted object. In either case, the fill can be thought of as an overlay, whether it be overlaying a hole-region where pixels have been removed or a hole-region where pixels have not been removed. As will be appreciated, the configuration of the device 100 may vary from one embodiment to the next. To this end, the discussion herein will focus more on aspects of the device 100 that are related to facilitating removing an unwanted object from a primary image and filling the resulting hole-region with a visually plausible background derived from one or more other related auxiliary images, and less so on standard componentry and functionality typical of computing devices.

The device 100 can comprise, for example, a desktop computer, a laptop computer, a workstation, an enterprise class server computer, a handheld computer, a tablet computer, a smartphone, a set-top box, a game controller, and/or any other computing device that can display images and allow a user to effectively replace (which includes removing pixels or covering pixels) a section of a primary image with a corresponding section from an auxiliary image.

In the illustrated embodiment, the device 100 includes one or more software modules configured to implement certain of the functionalities disclosed herein, as well as hardware configured to enable such implementation. These hardware and software components may include, among other things, a processor 132, memory 134, an operating system 136, input/output (I/O) components 138, a communication adaptor 140, data storage module 114, and the image inpainting system 102. An image database 120 (e.g., that comprises a non-transitory computer memory) stores at least a primary image and one or more other related auxiliary images used to fill a hole-region of the primary image, and is coupled to the data storage module 114. A bus and/or interconnect 144 is also provided to allow for inter- and intra-device communications using, for example, communication adaptor 140. Note that in an example, components like the operating system 136 and the image inpainting system 102 can be software modules that are stored in memory 134 and executable by the processor 132. In an example, at least sections of the image inpainting system 102 can be implemented at least in part by hardware, such as by Application-Specific Integrated Circuit (ASIC) or microcontroller with one or more embedded routines. The bus and/or interconnect 144 is symbolic of all standard and proprietary technologies that allow interaction of the various functional components shown within the device 100, whether that interaction actually take place over a physical bus structure or via software calls, request/response constructs, or any other such inter and intra component interface technologies, as will be appreciated.

Processor 132 can be implemented using any suitable processor, and may include one or more coprocessors or controllers, such as an audio processor or a graphics processing unit, to assist in processing operations of the device 100. Likewise, memory 134 can be implemented using any suitable type of digital storage, such as one or more of a disk drive, solid state drive, a universal serial bus (USB) drive, flash memory, random access memory (RAM), or any suitable combination of the foregoing. Operating system 136 may comprise any suitable operating system, such as Google Android, Microsoft Windows, or Apple OS X. As will be appreciated in light of this disclosure, the techniques provided herein can be implemented without regard to the particular operating system provided in conjunction with device 100, and therefore may also be implemented using any suitable existing or subsequently-developed platform. Communication adaptor 140 can be implemented using any appropriate network chip or chipset which allows for wired or wireless connection to a network and/or other computing devices and/or resource. The device 100 also include one or more I/O components 138, such as one or more of a tactile keyboard, a display, a mouse, a touch sensitive display, a touch-screen display, a trackpad, a microphone, a camera, scanner, and location services. In general, other standard componentry and functionality not reflected in the schematic block diagram of FIG. 1 will be readily apparent, and it will be further appreciated that the present disclosure is not intended to be limited to any specific hardware configuration. Thus, other configurations and subcomponents can be used in other embodiments.

Also illustrated in FIG. 1 is the image inpainting system 102 implemented on the device 100. In an example embodiment, the system 102 includes an object removal selection module 104, a geometric transformation module 106, a photometric transformation module 108, and a hole-region filling module 110. In an example, the components of the system 102 are in communication with one another or other components of the device 100 using the bus and/or interconnect 144, as previously discussed. The components of the system 102 can be in communication with one or more other devices including other computing devices of a user, server devices (e.g., cloud storage devices), licensing servers, or other devices/systems. Although the components of the system 102 are shown separately in FIG. 1, any of the subcomponents may be combined into fewer components, such as into a single component, or divided into more components as may serve a particular implementation.

In an example, the components of the system 102 performing the functions discussed herein with respect to the system 102 may be implemented as part of a stand-alone application, as a module of an application, as a plug-in for applications, as a library function or functions that may be called by other applications, and/or as a cloud-computing model. Thus, the components of the system 102 may be implemented as part of a stand-alone application on a personal computing device or a mobile device. Alternatively, or additionally, the components of the image editing system 102 may be implemented in any application that allows digital content editing, including, but not limited to, ADOBE® ILLUSTRATOR®, ADOBE® LIGHTROOM®, ADOBE PHOTOSHOP®, ADOBE® SENSEI®, ADOBE® CREATIVE CLOUD®, and ADOBE® AFTER EFFECTS® software. "ADOBE," "ADOBE ILLUSTRATOR", "ADOBE LIGHTROOM", "ADOBE PHOTOSHOP", "ADOBE SENSEI", "ADOBE CREATIVE CLOUD", and "ADOBE AFTER EFFECTS" are registered trademarks of Adobe Inc. in the United States and/or other countries.

As discussed, the system 102 receives a primary image 400a and an auxiliary image 400b. The object removal selection module 104 receives, from a user via an appropriate user interface, an object or a first region in the primary image 400a that is to be replaced by a corresponding second region of the auxiliary image 400b. However, initially, the primary image 400a and the auxiliary image 400b may not be aligned, and hence, copying the second region from the auxiliary image 400b to the first region of the primary image 400a may generate a misaligned region in the primary image.

As discussed, the primary image 400a and the auxiliary image 400b may not be geometrically aligned—for example, the two images captured by a camera (or by two different cameras) may be of a same scene, but captured from a different angle, with a different zoom level, from a different location, and/or the like. Thus, although both the primary image 400a and the auxiliary image 400b are of the same scene, the two scenes may not be geometrically aligned. In some embodiments, the geometric transformation module 106 may perform geometric transformations on the auxiliary image, e.g., to geometrically align the two images. Examples of such geometric transformations include affine transformation and homographic transformation, which include transformations such as scaling (e.g., uniform or non-uniform scaling), translation, rotation, and distortion. In some other examples, such geometric transformations could, however, be parameterized in many other ways, including deformations defined by splines defined on a 2D grid, such as a 2×2, 3×3, or in general, N×N grid, radial basis functions defined on a set of anchoring points, by reprojection from one camera viewpoint to another based upon estimated depth information, and/or by learned parametric models such as neural network models trained to detect edges, contours, corners, and/or other deep features or patterns that can be consistently detected by a sufficiently trained model.

For example, in some such embodiments, edge detection within the primary image 400a and/or auxiliary image 400b can be accomplished with a standard convolutional neural network (CNN) edge or contour detector. Similarly, there are numerous known deep learning models suitable for detecting corners within an image, or detecting other identifiable patterns or features within an image. As will be appreciated, any such deep learning models can be used to identify features that can then be used to geometrically align one image or image portion to another image or image portion, according to some embodiments of the present disclosure. Similarly, there are numerous known deep learning models suitable for detecting colors within an image, and any such models can be used to identify features that can then be used to photometrically align one image or image portion to another image or image portion, according to some embodiments of the present disclosure.

As discussed, the primary image 400a and the auxiliary image 400b may also not be photometrically aligned—for example, the two images may be captured by the camera(s) under different lighting conditions, different exposure, with changes in white balance, with changes in illumination, and/or the like. Copying a region of the auxiliary image 400b to a corresponding region of the primary image 400a, without correcting for such photometric misalignment, may result in the copied portion being darker or lighter than surrounding region in the modified primary image 400a1. Accordingly, in some embodiments, the auxiliary image 400b is first photometrically transformed by the photometric transformation module 108, such that the transformed auxiliary image 400b photometrically matches with the primary image 400a, within a given threshold.

Once the geometric and/or the photometric transformation of the auxiliary image 400b is complete, the hole-region filling module 110 copies the region of the auxiliary image 400b to the corresponding selected region of the primary image 400a, e.g., to generate the modified primary image 400a1.

Figure 2:
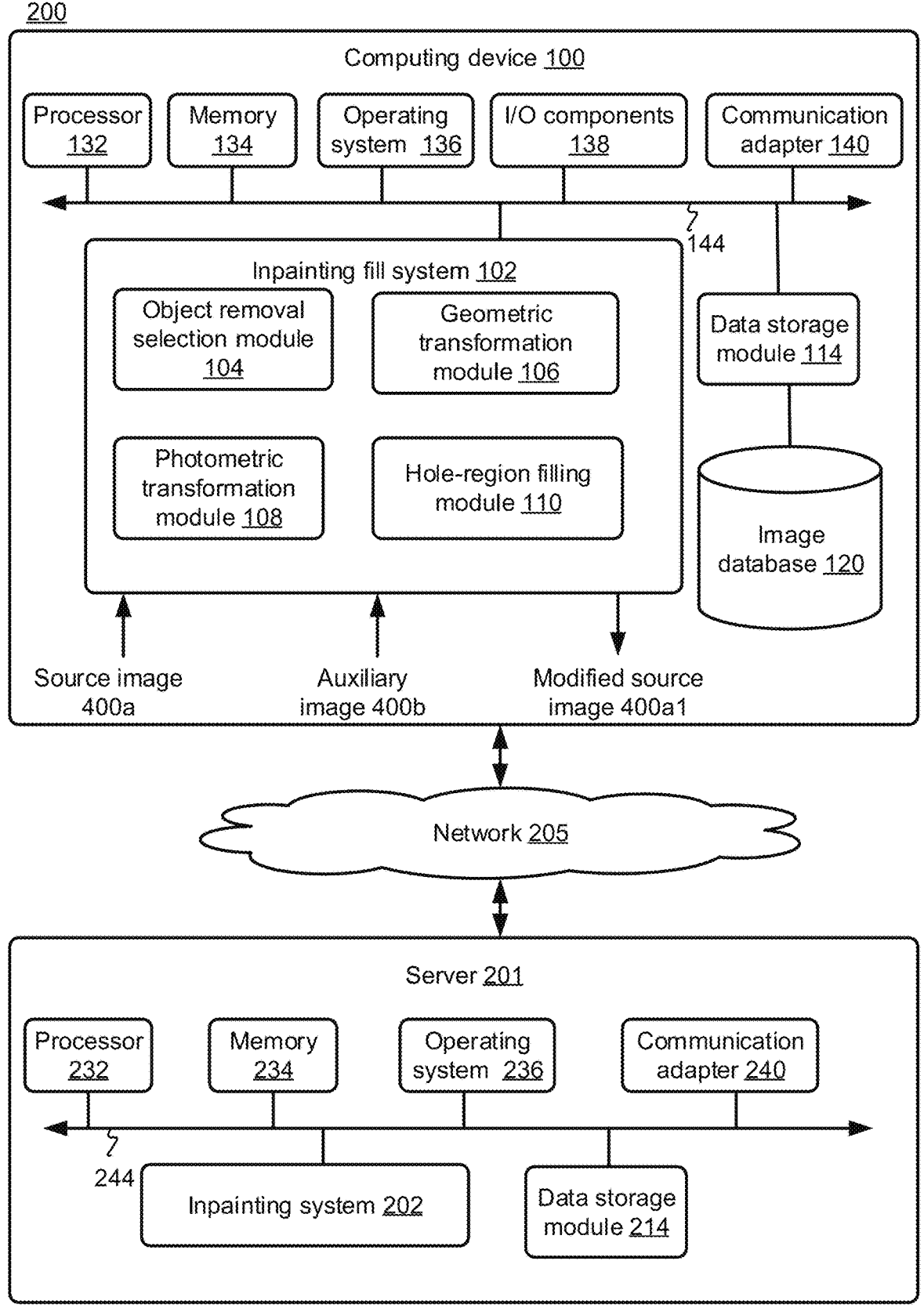
FIG. 2 is a block diagram schematically illustrating selected components of an example system comprising the computing device of FIG. 1 communicating with server device(s), where the combination of the device and the server device(s) are configured to provide an image inpainting service to effectively replace a selected region of a primary image with a corresponding region of an auxiliary image, in accordance with another embodiment of the present disclosure.

FIG. 2 is a block diagram schematically illustrating selected components of an example system 200 comprising the computing device 100 of FIG. 1 communicating with server device(s) 201, where the combination of the device 100 and the server device(s) 201 (henceforth also referred to generally as server 201) are configured to provide image inpainting service to effectively replace a selected region of a primary image with a corresponding region of an auxiliary image, in accordance with some embodiments.

In an example, the communication adaptor 140 of the device 100 can be implemented using any appropriate network chip or chipset allowing for wired or wireless connection to network 205 and/or other computing devices and/or resources. To this end, the device 100 is coupled to the network 205 via the adaptor 140 to allow for communications with other computing devices and resources, such as the server 201. The network 205 is any suitable network over which the computing devices communicate. For example, network 205 may be a local area network (such as a home-based or office network), a wide area network (such as the Internet), or a combination of such networks, whether public, private, or both. In some cases, access to resources on a given network or computing system may require credentials such as usernames, passwords, or any other suitable security mechanism.

In one embodiment, the server 201 comprises one or more enterprise class devices configured to provide a range of services invoked to provide image inpainting services, as variously described herein. Examples of such services include receiving from the device 100 input comprising a primary image 400a, an auxiliary image 400b, and a selection of an object or area of the primary image 400a that is to be replaced or overlaid by a corresponding region of the auxiliary image 400b; transforming (e.g., geometrically and/or photometrically) the auxiliary image 400b to align to the primary image 400a; and copying the region from the auxiliary image 400b to the corresponding selected region of the primary image 400a to generate a modified primary image 400a1. Although one server 201 implementation the image inpainting system is illustrated in FIG. 2, it will be appreciated that, in general, tens, hundreds, thousands, or more such servers can be used to manage an even larger number of image fill functions.

In the illustrated embodiment, the server 201 includes one or more software modules configured to implement certain of the functionalities disclosed herein, as well as hardware configured to enable such implementation. These hardware and software components may include, among other things, a processor 232, memory 234, an operating system 236, an image inpainting system 202 (also referred to as system 202), data storage module 214, and a communication adaptor 240. An image database (e.g., that comprises a non-transitory computer memory) comprises multiple primary images and/or auxiliary images, and is coupled to the data storage module 214. A bus and/or interconnect 244 is also provided to allow for inter- and intra-device communications using, for example, communication adaptor 240 and/or network 205. Note that components like the operating system 236 and image inpainting system 202 can be software modules that are stored in memory 234 and executable by the processor 232. The previous relevant discussion with respect to the symbolic nature of bus and/or interconnect 144 is equally applicable here to bus and/or interconnect 244, as will be appreciated.

Processor 232 is implemented using any suitable processor, and may include one or more coprocessors or controllers, such as an audio processor or a graphics processing unit, to assist in processing operations of the server 201. Likewise, memory 234 can be implemented using any suitable type of digital storage, such as one or more of a disk drive, a universal serial bus (USB) drive, flash memory, random access memory (RAM), or any suitable combination of the foregoing. Operating system 236 may comprise any suitable operating system, and the particular operating system used is not particularly relevant, as previously noted. Communication adaptor 240 can be implemented using any appropriate network chip or chipset which allows for wired or wireless connection to network 205 and/or other computing devices and/or resources. The server 201 is coupled to the network 205 to allow for communications with other computing devices and resources, such as the device 100. In general, other componentry and functionality not reflected in the schematic block diagram of FIG. 2 will be readily apparent in light of this disclosure, and it will be further appreciated that the present disclosure is not intended to be limited to any specific hardware configuration. In short, any suitable hardware configurations can be used.

The server 201 can generate, store, receive, and transmit any type of data, including graphical content such as digital images (e.g., primary images, auxiliary images). As shown, the server 201 includes the image inpainting system 202 that communicates with the system 102 on the client device 100. In an example, the image inpainting features discussed with respect to FIG. 1 can be implemented in FIG. 2 exclusively by the image inpainting system 102, exclusively by the image inpainting system 202, and/or may be shared between the image inpainting systems 102 and 202. Thus, in an example, none, some, or all image fill features, including image transformation features, are implemented by the image inpainting system 202.

For example, when located in the server 201, the image inpainting system 202 comprises an application running on the server 201 or a portion of a software application that can be downloaded to the device 100. For instance, the system 102 can include a web hosting application allowing the device 100 to interact with content from the image inpainting system 202 hosted on the server 201. In this manner, the server 201 transforms the auxiliary image and/or fill section of the primary image from corresponding sections of the auxiliary image based on the digital content and user interaction within a graphical user interface provided to the device 100.

Thus, the location of some functional modules in the system 200 may vary from one embodiment to the next. For instance, while the geometric transformation module 106 is shown on the client side in this example case, it may be on the server side (e.g., within the system 202) in other embodiments. Any number of client-server configurations will be apparent in light of this disclosure. In still other embodiments, the techniques may be implemented entirely on a user computer, e.g., simply as stand-alone image modification application. Similarly, while the image database 120 is shown on the client side in this example case, it may be on the server side in other embodiments, such as a cloud-based image database. Thus, the database of the primary and auxiliary images can be local or remote to the device 102, so long as it is accessible by the geometric transformation module 106 that is implemented by the system 102 or implemented by the system 202.

Example Operation

Figure 3A:
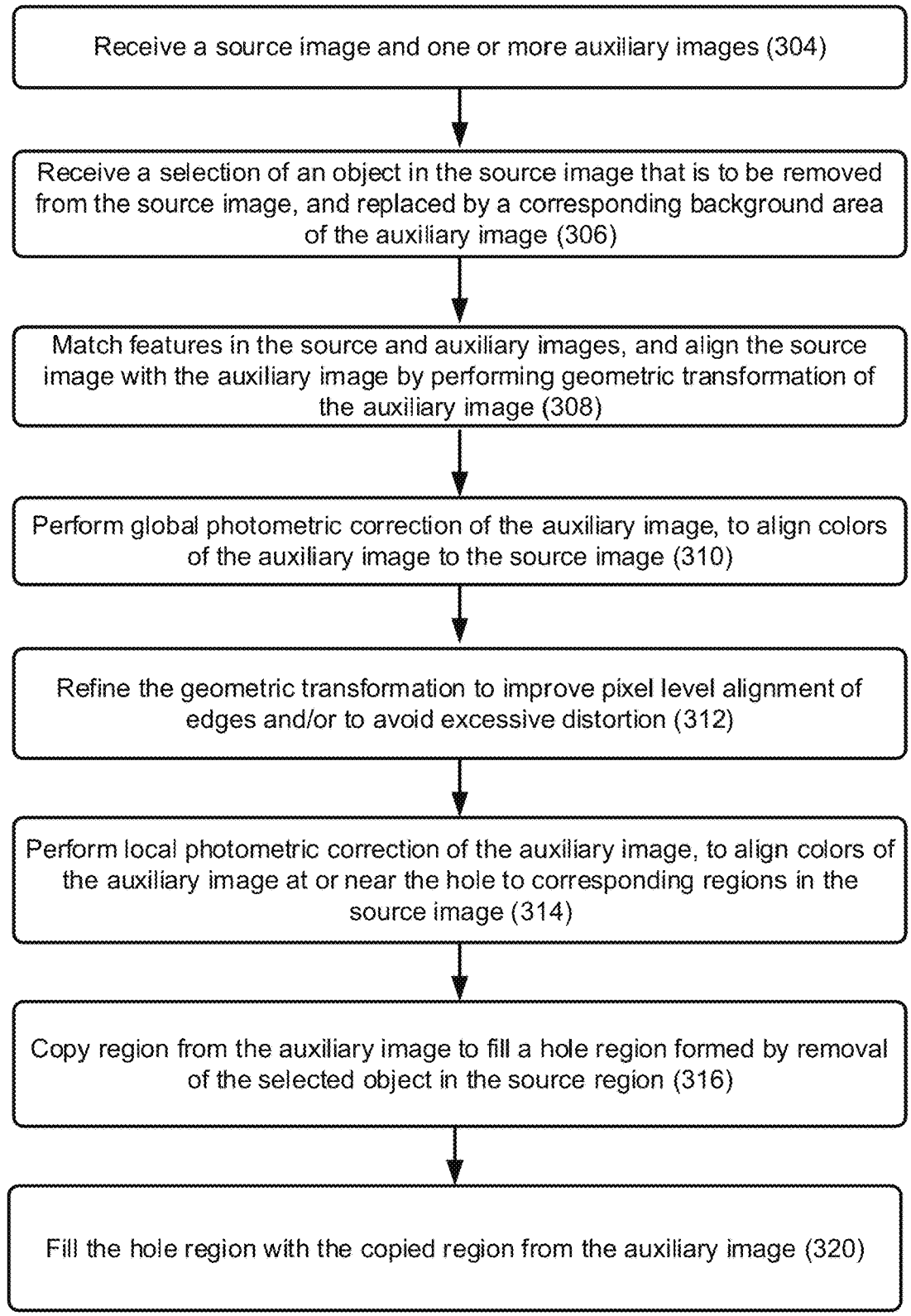
FIG. 3A is a flowchart illustrating an example method for providing image inpainting, in which a region of a primary image is effectively replaced with a background appearance derived from one or more auxiliary images that are similar to the primary image, in accordance with an embodiment of the present disclosure.

FIG. 3A is a flowchart illustrating an example method 300a for providing image inpainting, in which a region of a primary image is effectively replaced with a background appearance derived from one or more auxiliary images that are similar to the primary image, in accordance with some embodiments. Method 300a can be implemented, for example, using the system architecture illustrated in FIGS. 1 and/or 2, and described herein. However other system architectures can be used in other embodiments, as apparent in light of this disclosure. To this end, the correlation of the various functions shown in FIG. 3A to the specific components and functions illustrated in FIGS. 1 and 2 is not intended to imply any structural and/or use limitations. Rather, other embodiments may include, for example, varying degrees of integration wherein multiple functionalities are effectively performed by one system. In another example, multiple functionalities may be effectively performed by more than one system. For example, in an alternative embodiment, a first server may facilitate displaying a primary image and one or more auxiliary images, and a second server may provide the image inpainting functionality. In yet another embodiment, a client device (such as device 100, instead of a server) may display the images and/or may provide also functionality associated with image inpainting. Thus, although various operations of the method 300a are discussed herein as being performed by the image inpainting system 102 of the computing device 100, one or more of these operations can also be performed by the image inpainting system 202 of the server 201 as well.

While FIG. 3A illustrates the method 300a for filling a region of a primary image with background derived from an auxiliary image, FIGS. 4A, 4B, 4C, 4C1, 4C2, 4D, 4E, 4F, 4G, 4H, and 4I illustrate primary and auxiliary images depicting various stages of the image inpainting process, in accordance with some embodiments. FIGS. 3A and 4A-4I will be discussed herein in unison.

Figure 4A:
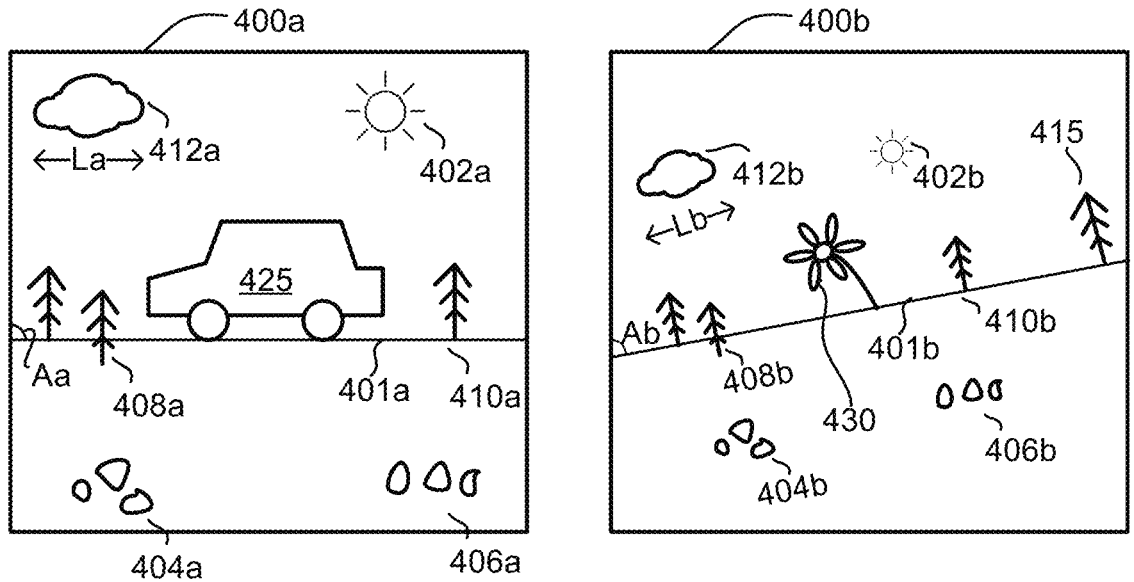

The method 300a comprises, at 304, receiving a primary image and one or more auxiliary images. As discussed herein, the method 300a aims to remove an unwanted object from the primary image, and fill a resulting hole-region in the primary image with a visually plausible background derived from the one or more auxiliary images. FIG. 4A illustrates the primary image 400a and the auxiliary image 400b. Although merely one auxiliary image 400b is illustrated, the method 300a is not limited to using one auxiliary image, and the method 300a can use more than one auxiliary images.

The images 400a, 400b are depicted using simple clip-arts for purposes of simplicity and so as to not obfuscate the teachings of this disclosure. The primary image 400a and auxiliary image 400b are of a same scene, e.g., taken from different angles and/or positions, at different times, at different zoom levels, at different lighting condition, at different light exposure levels, and/or the like. In an example, the primary image 400a and auxiliary image 400b are taken without any lateral movement of the camera, and with rotational movement of the camera. In another example, the primary image 400a and auxiliary image 400b are taken with some lateral movement and/or rotational movement of the camera.

For example, the image 400b is of the same scene as the image 400a, but with the camera rotated by an angle. For example, in the image 400a, the horizon 401a is at an angle Aa (e.g., which may be approximately 90 degrees) with respect to an edge of the image 400a, whereas in the image 400b, the horizon 401b is at an angle Ab with respect to an edge of the image 400b. The angles Aa and Ab are different (e.g., Ab is less than Aa in this example), indicating a rotation of the camera between the shots for the images 400a, 400b.

Furthermore, a length of a feature 412a in the image 400a (e.g., which is a cloud) is La, and a length of a corresponding feature 412b in the image 400b is Lb, where La is larger than Lb. This implies, that the camera may have been zoomed out while capturing the image 400b, relative to while capturing the image 400a and/or implies that the image 400b was taken from a greater distance from an object associated with features 412a, 412b than the image 400a. Thus, the image 400b is a rotated and scaled version of the image 400a.

Thus, the image 400b is a geometrically transformed version of the image 400a. Although rotation and scaling are examples of transformations in the image 400b relative to the image 400a, other type of geometric transformations are also possible, such as translation, distortion, etc.

Because the image 400a and the image 400b are of the same scene, the two images 400a, 400b are likely to have common features of interest. For example, feature 404a (which may be rocks, for example) of the primary image 400a corresponds to feature 404b of auxiliary image 400b. Thus, for example, feature 404a of the primary image 400a and the feature 404b of auxiliary image 400b both represent the same rocks of the scene, and hence, are visually same or similar in the two images. Similarly, features 402a (e.g., the sun), 406a (e.g., rocks), 408a (e.g., trees), 410a (e.g., trees) of the image 400a respectively correspond to features 402b, 406b, 408b, and 410b of the image 400b. Matching of features of the two images 400a, 400b are discussed herein in turn in further detail. It may be noted that as the image 400b is a rotated and scaled version of the image 400a, a feature of the image 400b is also a rotated and scaled version of a corresponding feature of the image 400a. For example, the cloud 412b is a rotated and scaled version of the cloud 412a.

In an example, the primary image 400a includes an unwanted object that a user intends to remove from the image 400a. In the example of FIG. 4A, the user intends to remove an object 425, which is a car in this example. As depicted in the image 400b in which the car is not present, the car 425 blocks a view of an object 430, which is a flower in this example. Thus, once the car 425 is removed from the primary image 400a, a resulting void or hole-region in the primary image 400a is to be filled using a corresponding background area of the auxiliary image 400b (i.e., the resulting void or hole-region is to be filled at least in part using the flower 430). Referring to FIG. 3A, the method 300a comprises, at 306, receiving a selection (e.g., by the object removal selection module 104 of the system 102 of FIGS. 1 and 2) of an object in the primary image 400a that is to be removed from the primary image 400a and replaced by a corresponding background area of the auxiliary image 400b. The object 425 that is selected for removal defines a hole-region (or a void region) in the primary image 400a, that is to be filled with corresponding section of image from the auxiliary image 400b.

Figure 4B:
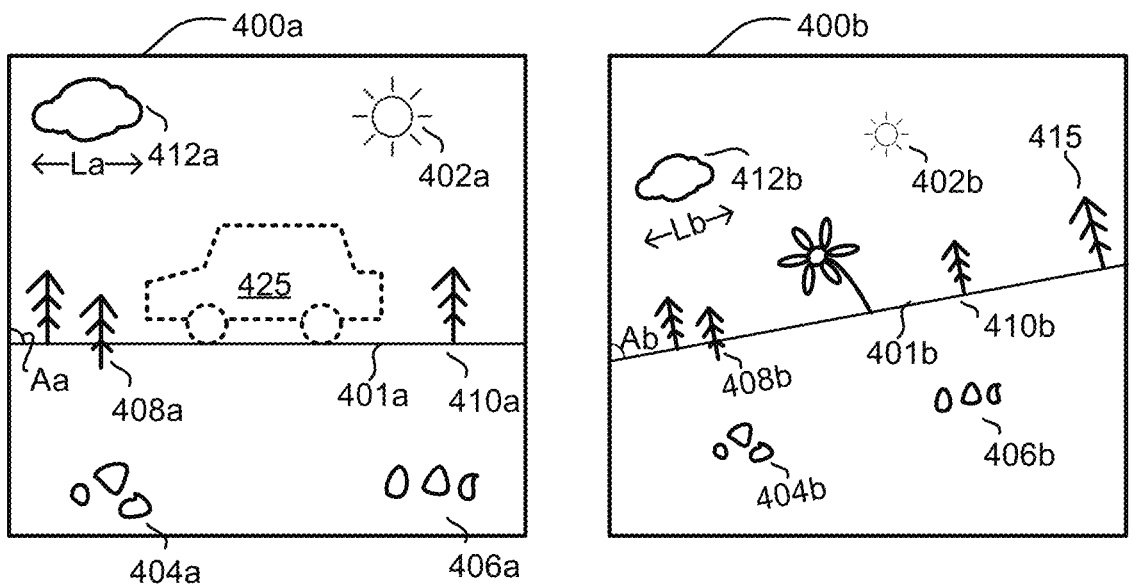
Figure 4D:
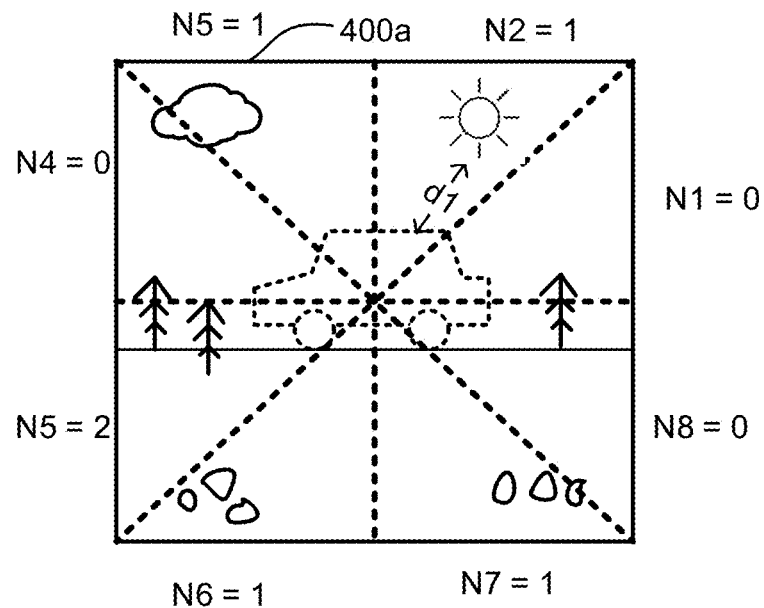
Figure 4D:
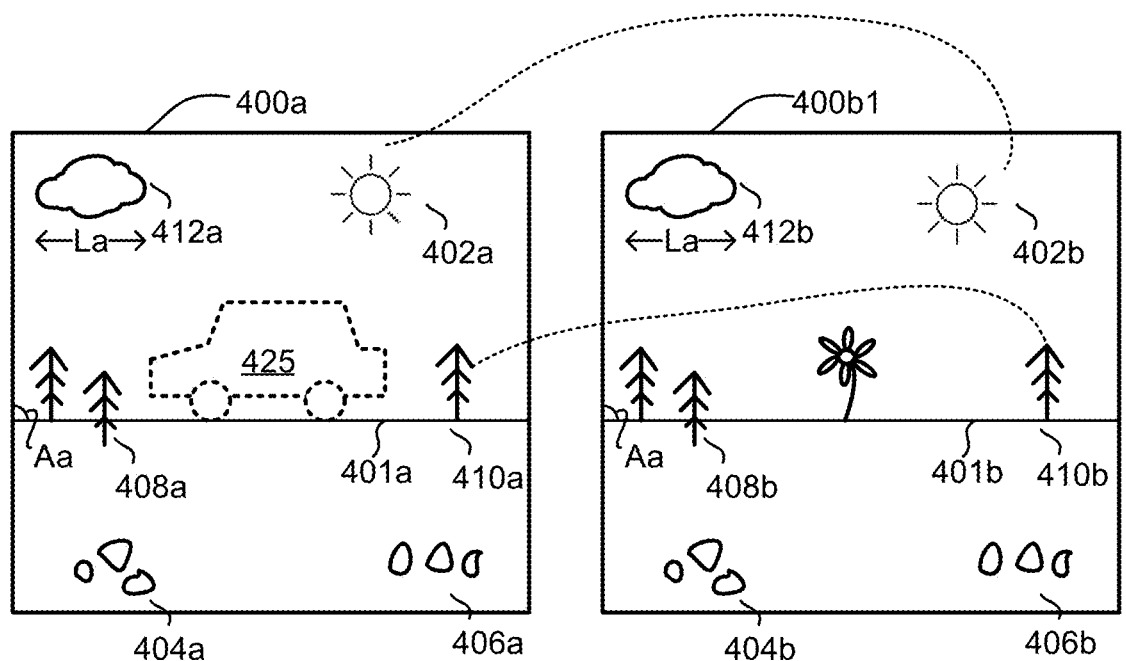

For example, FIG. 4B illustrates the object 425, e.g., the car, being selected for removal. Merely as an example, the car 425 is illustrated using dotted line, to indicate that the car is selected for removal (although in other examples, the object to be removed can be highlighted in any other manner).

The selection of the object (or area of the primary image 400a) to be removed can be done using any appropriate manner. For example, a user can select the object to be removed by an appropriate user input action (e.g., by a click, tap, or any other appropriate user input action). In another example, the user can draw a boundary of an object or an area to be removed from the primary image 400a. In yet another example, the user can specify (e.g., using an appropriate user interface) that a car is to be removed from the image 400a, and the object removal selection module 104 can identify the car in the image 400a, and select the car 425 for removal. This disclosure is not limited by a manner in which the object to be removed is selected or identified, and the selection process is implementation specific.

The method 300a further comprises, at 308, matching features in the primary and auxiliary images, and geometrically aligning (e.g., by the geometric transformation module 106) the primary image 400a with the auxiliary image 400b by performing geometric transformation of the auxiliary image 400b. For example, as discussed herein above with respect to FIG. 4A, the image 400b is not geometrically aligned to the image 400a—rather, the image 400b is a rotated and scaled version of the image 400a. The operations at 308 aim to overcome such misalignments, by rotating and scaling the image 400b, such that the image 400b is aligned to the image 400a. For example, FIG. 4C illustrates the image 400a and an image 400b1 after the operations at 308, where image 400b1 is representation of the image 400b after the geometric transformation has been performed. In FIG. 4C, the feature 412b in image 400b1 has substantially the length La, i.e., same as the length of the feature 412a. Similarly, the horizon 401b in the image 400b1 is substantially at the angle Aa with respect to the edge of the image 400b. In an example, due to the scaling of the contents of the image 400b, the feature 415 (which was visible in FIGS. 4A, 4B) is not visible in the image 400b1.

Figure 3B:
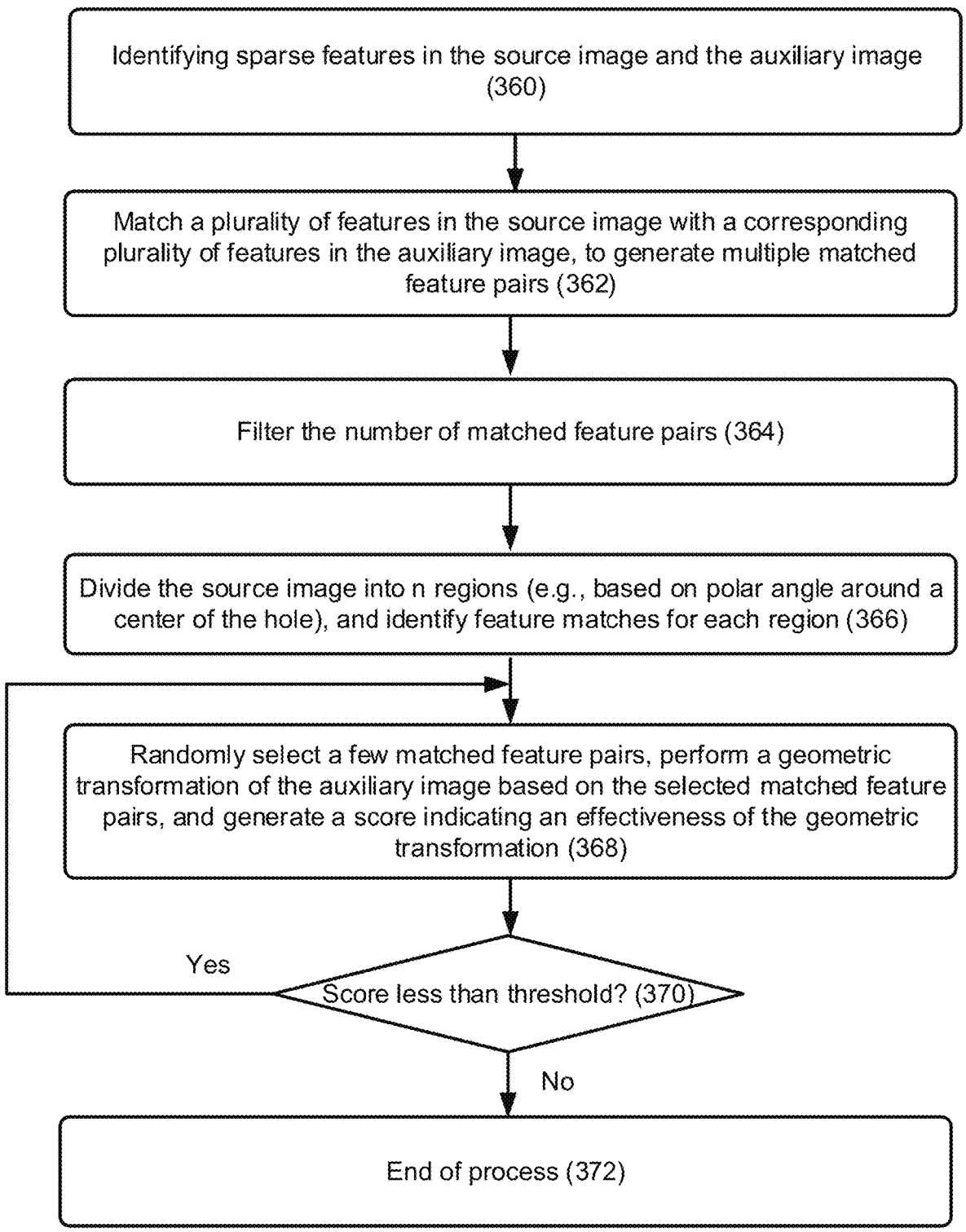
FIG. 3B is a flowchart illustrating an image alignment process of the method of FIG. 3A, in accordance with an embodiment of the present disclosure.

FIG. 3B is a flowchart illustrating the matching and the geometric transformation operations at 308 of the method 300 of FIG. 3A in further details, in accordance with some embodiments. The method 308 of FIG. 3B comprises, at 360, identifying a plurality of features in the images 400a, 400b. For example, individual features (e.g., features 402a, 404a, 406a, 408a, 410a, 412a, 402b, 404b, 406b, 408b, 410b, 412b) of the images 400a, 400b are identified. These features may be sparse features in the images 400a, 400b, such that the features can be readily distinguished from its surrounding pixels. Thus, these features may have unique pixel signatures or values relative to the surrounding pixels, such that these features can be easily identified. In an example, these features may be darker or brighter, or of a different color, than the surrounding area in the image. For example, a relatively blurry patch of grass in a lawn is not easily distinguishable. But a rock in a lawn or the sun in the sky are easily distinguishable—hence, these are sparse features that are identified at 360.

In an example, after identifying a feature in an image, a descriptor of the feature is generated, where the descriptor includes, for instance, information indicating a position of the feature in the image, pixel color information of the feature, and size of the feature. In an example, feature descriptors of various features of the two images are compared to find matching features in the two images 400a, 400b. For example, the method 308 of FIG. 3B comprises, at 362, matching a plurality of features in the primary image 400a with a corresponding plurality of features in the auxiliary image 400b. Thus, multiple pairs of matched features are generated in 362 of the method 308, where a matched feature pair includes a feature from the image 400a and a corresponding feature from the image 400b. Examples of matched feature pairs are illustrated in FIG. 4C1 using dotted lines. For example, feature 402a of the image 400a and feature 402b of the image 400b form a pair of matched features due to the similarities between these two features, and hence, these two features are connected using a dotted line in FIG. 4C1. The matched feature pairs are determined using similarity of the features. Only some of the matched feature pairs are indicated by dotted lines in FIG. 4C1. As discussed, spare features of the images 400a, 400b may be included in the feature pairs.

It may be noted that two features in a matched feature pair need not match exactly, as the image 400b may be a geometrically and/or photometrically transformed version of the image 400a. For example, the lengths of the features 412a and 412b are La and Lb, respectively, as previously discussed herein.

In an example, matching the features in the two images 400a, 400b and/or generating the matched feature pairs may be performed at least in part using Scale-invariant feature transform (SIFT) algorithm. In an example, key-points of objects are first extracted from the image 400a and stored in a database. An object is recognized in the image 400b by individually comparing each feature from the image 400b to this database and finding candidate matching features based on Euclidean distance of their feature vectors or descriptor vector. These candidate matches can also be further filtered by the rejection of likely outlier matches. This is also known as David Lowe's ratio test. This can be done by finding and selecting, in one image, the best two or more (or relatively good two or more) correspondences in the other image. If a selected correspondence is of similar visual quality to other various other objects or correspondences (e.g., as determined by an algorithm running on the corresponding sparse keypoint regions, such as a comparison of the Euclidean distance between feature descriptors), then the selected correspondence is rejected. Such rejection is because the selected correspondence is not sufficiently visually unique. Put differently, if a correspondence is not sufficiently visually unique, the correspondence is rejected. Subsequently, the matches from the selected correspondences that pass this test are retained. Feature matches that pass this test can be identified as being correct with higher confidence.

At 364 of the method 308, the matched features pairs are filtered, so as to limit the number of matched feature pairs. For example, the two images 400a, 400b may have hundreds, thousands, or tens of thousands of matched feature pairs. When an excessive number of feature pairs is generated, features that are relatively larger in size (e.g., includes higher number of pixels) are included and smaller features are filtered out. For example, a collection of few rocks or a large rock can be included, whereas a small pebble can be filtered out. In another example, feature pairs that may possibly be wrong are filtered out. For example, in FIG. 4C1, features 410a and 415 of the images 400a, 400b, respectively, are matched—however, their locations do not match—so, this matched feature pair is a relatively "bad" match and hence filtered out, symbolically indicated by a cross in the dotted line joining these features in FIG. 4C1.

Thus, in some embodiments, when the number of feature pairs are relatively large, a score is assigned to each feature pair, where the score is an indication of factors such as how well the two features of the feature pair matches (e.g., the more aspects that match, the higher the score assigned to that feature pair), and/or size of the features. At 364, feature pairs with relatively lower scores are filtered out.

At 366, the primary image 400a is divided into n number of regions. Merely as an example, the division may be based on polar angles around a center of the hole, as illustrated in FIG. 4C2. For example, in FIG. 4C2, n=8, and the image 400a is divided in eight regions N1, N2, N3, N4, N5, N6, N7, and N8. Furthermore, a number of features (e.g., which are included in a matched feature pair) in each of these eight regions is identified. For example, region N2 has the sun, which matches with a corresponding feature in image 400b, and hence, region N2 has at least one matching feature. FIG. 4C2 illustrates example number of matches in each region N1, . . . , N8 (e.g., N1=0, N2=1, and so on). Although the example image 400a has just a few numbers of matching features, a real-life image depicting a natural scene is likely to have hundreds, thousands or even higher number of matches, and hence, each region is likely to have a high number of matches.

At 368, a few feature pairs of the plurality of feature pairs are selected randomly, and a geometric transformation of the auxiliary image 400b is performed based on the selected feature pairs. For example, if 10,000 matched feature pairs in the images 400a, 400b are identified after the filtering at 364, of those 10,000 feature pairs, a few (e.g., four feature pairs, eight feature pairs, tens of feature pairs, hundreds of feature pairs, or the like) are randomly selected from the 10,000 feature pairs. The randomly selected feature pairs are used to fit the parameters associated with a geometric transformation of the auxiliary image 400b, e.g., such that a feature of a selected matched feature pair in the image 400a sufficiently matches (e.g., within a given tolerance) in size, shape, location, and perspective with a corresponding feature of the matched feature pair in the image 400b. That is, the geometric transformation of the auxiliary image 400b aims to geometrically align the image 400b with the image 400a. The random selection and/or the geometric transformation may be performed, in an example, using RANSAC algorithm or by any other manner.

The geometric transformation of 368 may be affine transformation or homographic transformation. The affine transformation includes, for example, scaling (e.g., uniform or non-uniform scaling), translation, and rotation. Homographic transformation includes, for example, scaling (e.g., uniform or non-uniform scaling), translation, rotation, and perspective distortion. Affine transformation is a subset of homographic transformation. For example, two parallel lines in an image remains parallel, even after the image undergoes an affine transformation. On the other hand, two parallel lines in an image may, or may not, remain parallel, after the image undergoes a homographic transformation. Any combination of two or more types of transformations may also be used in 368 of the method 308. For example, as discussed herein previously, to align the images 400a, 400b, the image 400b has to undergo scaling and rotation.

The geometric transformation of 368 is based on the randomly selected matched feature pairs—for example, selection of a different set of feature pairs may possibly provide slightly different geometric transformation, and hence, slightly different alignment of the two images 400a, 400b. In an example, to measure the effectiveness of the random selection and the resultant geometric transformation (e.g., which may be indicative of how well the images 400a, 400b are aligned), a score is generated as follows:

$$\text{Score S=function of (H, di, Nj)}. \quad \text{Equation 1}$$

In equation 1, the score S is a function of H, which is representative of the geometric (e.g., homographic) transformation performed at 368. The score S is also a function of Nj, where Nj is a number of matches in a $j^{th}$ region of the image 400a that are selected in the random selection. For example, referring to FIG. 4C2, if the sun is selected in the random selection, then N2 is 1 (e.g., assuming that no other features of the region N2 is selected in the random selection)—else N2 is zero. The score tries to ensure that each region N1, . . . , N8 has some randomly selected matched features.

For example, assume in a first scenario, some regions have very high number of randomly selected matched features and some other regions have very low number of (or zero) randomly selected matched features. Also, assume a second scenario in which all regions have almost equal number of randomly selected matched features. Everything else being equal, the second scenario would have a higher score than the first scenario.

The score S is also a function of di, where di is representative of a distance of individual matched and selected (e.g., selected in the random selection) feature to a hole-region (where the hole-region is the region that is to be replaced in the primary image 400a, and in this example, region occupied by the car 425 is the hole-region). For example, the distance d1 in FIG. 4C2 represents a distance between the sun and the hole-region. The closer a matched feature is to the hole-region (i.e., the smaller di is), the higher is the score S. That is, the scoring function provides higher value if a randomly selected feature is closer to the hole-region.

The method 308 then proceeds to 370, where it is evaluated if the score is less than a threshold. If the score is less than the threshold (i.e., "Yes" at 370), the method loops back to 368, where the random selection process is repeated to select other matched feature pairs, the geometric transformation of the auxiliary image based on the selected feature pairs is repeated, and the score is generated once again. The operations at 368 and 370 are repeated in a loop, until a satisfactory score is achieved. It may be noted that, for example, the geometric transformation at, for example, the second iteration is independent of the geometric transformation at the first iteration. That is, if the score during the first iteration is not satisfactory, the auxiliary image 400b is reset, and the geometric transformation at the second iteration is performed on the original auxiliary image 400b (and not performed on the auxiliary image 400b after the image 400a has already undergone the transformation during the first iteration).

If the score is higher than the threshold (i.e., "No" at 370), the method 308 ends at 372. At this point, the geometric transformation module 106 has transformed the image 400b to a transformed image 400b1. The image 400b1 is substantially aligned to the image 400a, e.g., the alignment meets the target threshold requirement of operations 370 of FIG. 3B. FIG. 4C is an example of the image 400b1 at the end of the method 308, i.e., when the image 400b1 is substantially aligned with the image 400a.

Figure 4E:
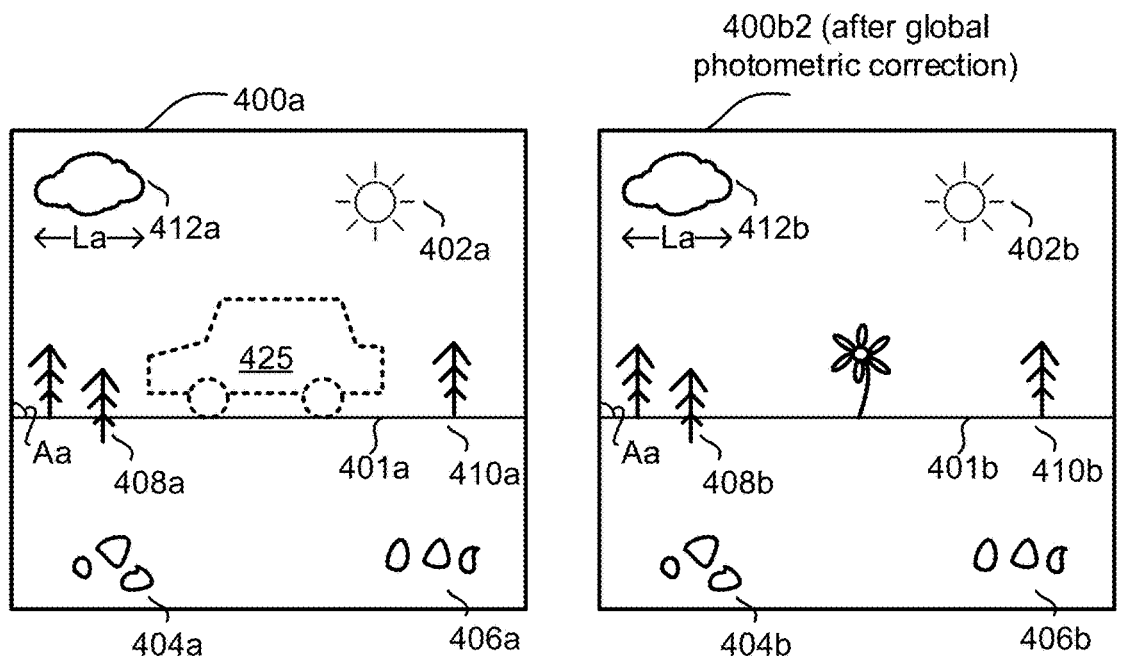

Referring again to FIG. 3A, the method 300a then proceeds (from the method 308) to 310, where a global photometric or color correction of the auxiliary image is performed (e.g., by the photometric transformation module 108), to match colors of the auxiliary image to the primary image. In an example, the global photometric correction is performed to compensate for any changes in exposure, lighting condition, white balance, illumination, etc. between the images 400a, 400b1. This photometric correction is referred to as "global," as the photometric correction is performed in the same manner throughout the image 400b1. The photometric correction involves changing pixel color (e.g., red (R), green (G) and/or blue (B) color information of individual pixels) of the image 400b1 to generate an image 400b2, such that color of features of the image 400b2 matches color of corresponding features of the image 400a, within a given match threshold. FIG. 4E illustrates the image 400b2, i.e., after the global photometric correction has been applied to the image 400b1. The color correction is not visible in the figures and the images 400b1 and 400b2 appear identical in FIGS. 4C and 4E, respectively, due to the black-and-white nature of the images.

For example, color information of an individual feature in image 400a is compared to color information of a corresponding individual feature in image 400b1. As an example, color information of the feature 402a (e.g., R, G, B color information of pixels of the feature 402a) is compared to the color information of the feature 402b, indicated symbolically using dotted line in FIG. 4D. Similarly, color information of the feature 410a is compared to the color information of the feature 410b, indicated symbolically using dotted line in FIG. 4D. Thus, all or at least some of the matched feature pairs (e.g., as discussed with respect to operations 362, 364 of FIG. 3B) are considered. Such comparisons are used to generate gain values $\alpha_R$, $\alpha_G$, and/or $\alpha_B$ for the R, G, and/or B channels, respectively, and to generate bias values $\beta_R$, $\beta_G$, and/or $\beta_B$ for the R, B, and/or B channels, respectively, where these values align or fit the colors of the features of the primary image 400a to the corresponding features of the auxiliary image 400b1. The color correction is then applied globally to all pixels of the image 400b1 to generate the image 400b2, as follows:

$$R_{1b} = \alpha_R \cdot R_{1a} + \beta_R \quad \text{Equation 2}$$

$$B_{1b} = \alpha_B \cdot B_{1a} + \beta_B \quad \text{Equation 3}$$

$$G_{1b} = \alpha_G \cdot G_{1a} + \beta_G \quad \text{Equation 4}$$

In equation 2, $R_{1b}$ represents red color pixel value for a first pixel in the image 400b2 after color correction, and $R_{1a}$ represents red color pixel value for the first pixel in the image 400b1 (e.g., before color correction). Similarly, equations 3 and 4 are for blue and green color channels, respectively. Individual pixels of the image 400b1 undergo this color correction process to generate corresponding pixels in the image 400b2—that is, the color correction process is applied globally throughout the auxiliary image.

In an example, instead of, or in addition to, implementing the global color correction using equations 2, 3, and 4, the global color correction can be performed by any other appropriate manner. For example, assume global color correction is applied to an image "A" to generate an image "B." In an example, the red, green, and blue color information of the B image can be generated by some other global color correction techniques, such as a 3×3 matrix times the red, green, and blue colors of the A image. In another example, the red, green, and blue color information of the B image can be generated to be a sum of (i) a 3×3 matrix times the red, green, and blue of the A image and (ii) a 3×1 bias vector. In yet another example, the red, green, and blue color information of the B image can be generated as a nonlinear per-channel color curve applied to any of these models. In yet another example, the red, green, and blue color information of the B image can be generated from a 3D lookup table defined jointly over all of the A image red, green, and blue colors, where the lookup table stores the resulting corrected color.

The method 300a of FIG. 3A then proceeds to 312, where the geometric transformation (performed previously at 308) is refined or fine-tuned to improve pixel-level alignment. For example, the geometric transformation performed previously at 308 may roughly align the auxiliary image to the primary image (e.g., to meet the threshold of 370 of FIG. 3B). But there may still be misalignment between the two images, e.g., by a few pixels. The refinement at 312 aims to reduce or eliminate such misalignment between the two images 400a, 400b2.

Figure 4F:
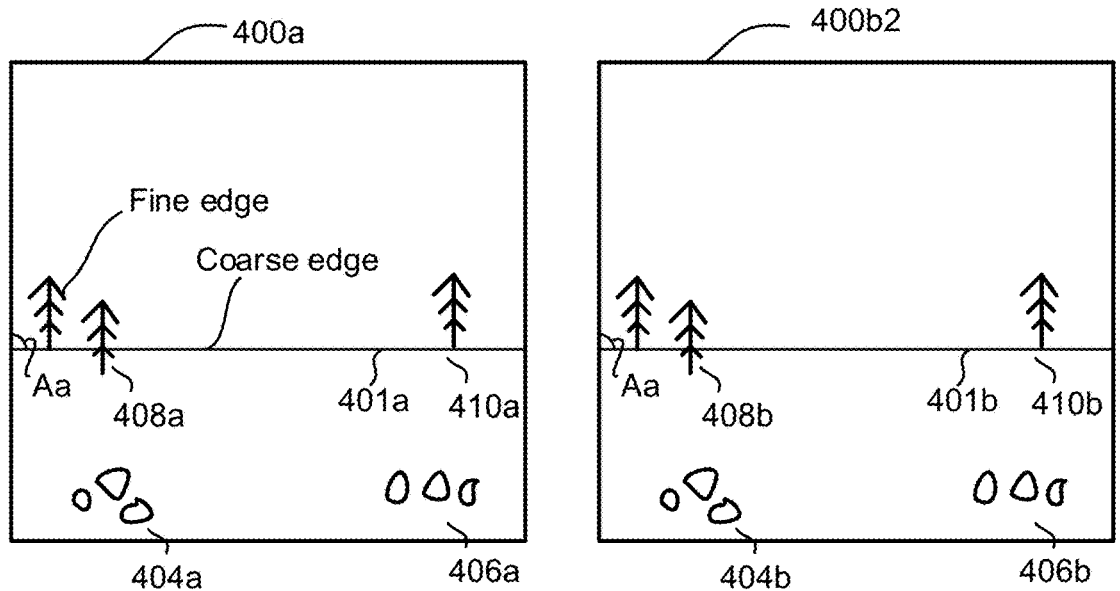

In some embodiments, the geometric transformation is refined by placing higher weightage on edges of various features, e.g., those edges that are relatively straight. For example, FIG. 4F illustrates features having relatively straight edges or prominent, such as the trunks of various trees, horizon 401b, and other depicted and detectable edge-like features. Some of the edges may be coarse, while some may be fine. For example, the horizon may have some grass or other irregularities, making the edge of the horizon relatively irregular or coarse. On the other hand, a tree trunk may have some irregularity (such as branches or leaves), but may be relatively fine. At 312, the geometric transformation is refined, e.g., to align the edges of corresponding features.

In an example, alignment of edges, as discussed with respect to 312, is an alignment of a fine scale feature. In some embodiments, in addition to, or instead of, aligning the edges at 312, other fine-scale features, such as contours, corners, and/or deep features, of the auxiliary image can be aligned with corresponding fine-scale features of the primary image. Although various examples discussed herein refer to alignment of edges during refinement of the geometric transformation, similar alignment can be performed for one or more other fine features as well, such as contours, corners, deep features, and/or any other appropriate fine-features of the auxiliary image and the primary image.

In an example, to refine the geometric transformation, edge maps of the two images 400a and 400b2 are generated, where the edge map indicates edges of various features. The pixels on the edge maps are then weighted higher than pixels elsewhere in the images. Subsequently, a geometric transformation is calculated that maximizes alignment of the two edge maps. For example, the geometric transformation is calculated that minimizes an energy function that is based on the weighted edge map.

In an example, the refinement of the geometric transformation is performed using Lucas-Kanade algorithm. Lucas-Kanade is a framework or family of algorithms for performing parameter estimation for image alignment. While implementing the Lucas-Kanade algorithm, as discussed herein above, in some embodiments, a spatial weighting scheme can be used, which emphasizes edge alignment. For example, as discussed, the edge pixels are weighted more than other pixels, when implementing the Lucas-Kanade algorithm.

Figure 4G:
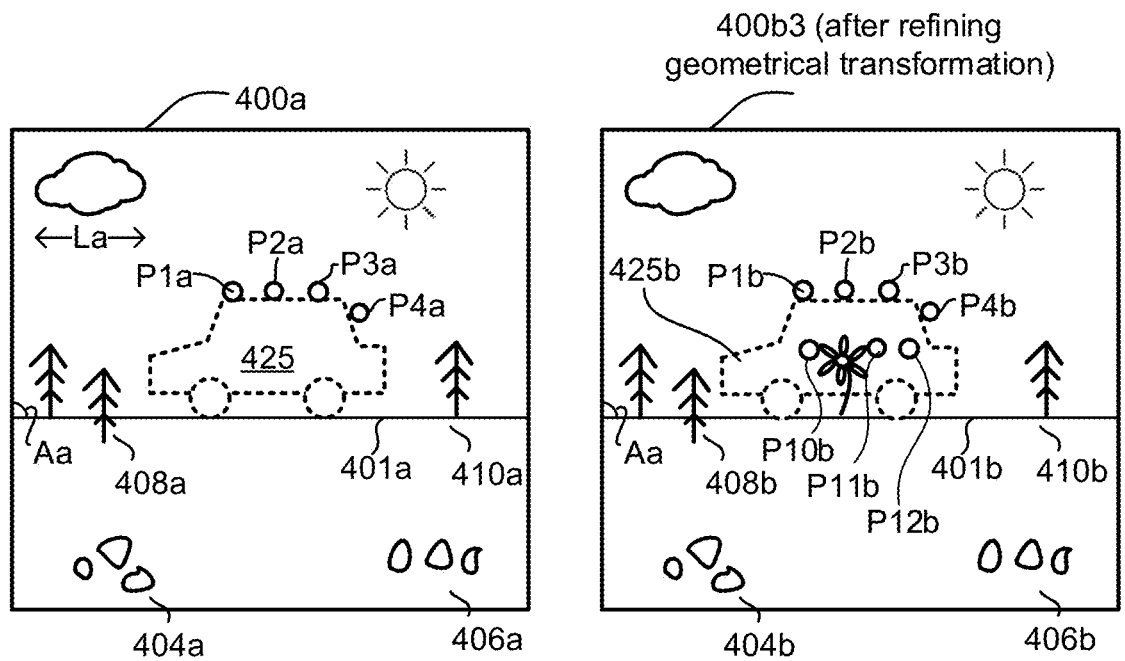

In an example, the geometric transformation of the auxiliary image (e.g., discussed with respect to 308 and/or 312) may be excessive, e.g., the auxiliary image may be too distorted to generate an alignment between the primary and auxiliary images. In some embodiments, to avoid such excessive distortion, an energy function used in the Lucas-Kanade algorithm is modified to add a penalty for too much distortion (e.g., to add a penalty for too much skew, too much non-uniform scaling, and/or the like). For example, if certain types of distortion (e.g., skew, non-uniform scaling, etc.) during the geometric transformation are beyond a threshold, the Lucas-Kanade algorithm is modified to add the penalty, such that such excessive distortion is avoided or reduced while calculating the geometric transformation and/or its refinement. In an example, Levenberg-Marquardt algorithm may be used for the refinement of the geometric transformation. In an example, refinement of the geometric transformation results in generation of auxiliary image 400b3 from the auxiliary image 400b2, where the auxiliary image 400b3 is illustrated in FIG. 4G.

In some embodiments, each of the geometric transformation process at 308 and/or the refinement of the geometric transformation process at 312 may be performed multiple times, e.g., with different initial guesses (e.g., as discussed with respect to FIG. 3B). In an example where two geometric transformations are performed as a part of a single iteration, a first fit uses an affine transformation model and a second fit uses a homographic transformation model.

In some embodiments, subsequent to the initial geometric transformation at 308 and the refinement of the geometric transformation at 312, the primary image 400a and the auxiliary image 400b2 are substantially geometrically aligned. Also, the global photometric correction at 310 photometrically matches, within a given tolerance, the auxiliary image 400b2 to the primary image 400a. However, there may still be some color mismatch between the two images. Accordingly, at 314 of the method 300, a local photometric or color correction of the auxiliary image 400b2 is performed (e.g., by the photometric transformation module 108), to align colors of the auxiliary image at, near and/or inside the hole-region to corresponding region in the primary image. "Near," in the context of 314 and/or in the context of at least some of the other operations discussed herein, implies within a threshold distance form the hole-region, where the threshold distance can be one pixel-length, two pixel-lengths, three pixel-lengths, or higher.

To perform the local photometric correction (e.g., local color correction), pixels at or near the boundary of the hole-region 425 in the primary image 400a, and corresponding pixels in a corresponding region 425b of the auxiliary image 400b3 are compared. For example, a boundary of the hole-region 425 is superimposed as a region 425b on the auxiliary image 400b3, and pixels at or near the boundary of the corresponding region 425b in the auxiliary image 400b3 are identified. FIG. 4G illustrates and labels four such pixels in each of the images 400a and 400b3. For example, a pixel P1a at or near the boundary of the hole-region 425 of the primary image 400a corresponds to a pixel P1b at or near a boundary of the corresponding region 425b of the auxiliary image 400b3. Similarly, a pixel P2a at or near the boundary of the hole-region 425 of the primary image 400a corresponds to a pixel P2b at or near a boundary of the corresponding region 425b of the auxiliary image 400b3, and so on.

In some embodiments, an example color map adjustment mask is generated as:

$$M(p)=\|S1(p)-S2(p)\| \quad \text{Equation 5}$$

In equation 5, M(p) is the color map adjustment mask, which is a function of pixel p. S1(p) is a pixel color value of a pixel at or near the boundary of the hole-region 425 of the primary image 400a, such as pixel P1a. S2(p) is a corresponding pixel at or near a boundary of the corresponding region 425b of the auxiliary image 400b3, such as pixel P1b. The color map adjustment mask M(p) is generated for each of a plurality of pixels at or near the boundary of the regions 425 and 425b, such as for pixels (P1a, P1b), pixels (P2a, P2b), pixels (P3a, P3b), pixels (P4a, P4b), and so on. For example, color map adjustment mask for pixels (P1a, P1b) may be: M(p1)=∥S1(p1a)−S2(p1b)∥; color map adjustment mask for pixels (P2a, P2b) may be: M(p2) =∥S1(p2a)−S2(p2b)∥, and so on. Equation 5 takes the pixel color value of individual pixels. For example, the equation can be repeated for each of red, green, and/or blue color channels, and for each of a plurality of pixels at or near the boundary of the hole-region 425.

In some embodiments, equation 5 can be modified to initially blur the pixels at or near a boundary of the regions 425, 425b of the images 400a, 400b3, and then take the pixel color value of individual blurred pixels. Because the geometric alignment of the primary and auxiliary images can be off by a few pixels (e.g., even after the refinement at 312 of FIG. 3A), blurring the pixels ensures that two misaligned pixels are not compared when generating the color map adjustment mask. In such a scenario, the color map adjustment mask is generated as follows:

$$M(p)=\|S1^*(p)-S2^*(p)\| \quad\quad \text{Equation 5A}$$

where S1*(p) and S2*(p) are pixel values of respective blurred pixels.

In some embodiments, the color map adjustment mask is compared to a threshold value T. For example, it is checked whether:

$$M(p)<T. \quad\quad \text{Equation 6}$$

If the condition of equation 6 is not satisfied, this implies that there is a larger color mismatch between a pixel of the primary image 400a and a corresponding pixel of the auxiliary image 400b3. This can happen when there is a misalignment between the two images. Additionally or alternatively, this may happen if, for example, an object which is not in the primary image is present in the auxiliary image (or an object which is not in the auxiliary image is present in the primary image). For example, because the primary and auxiliary images are taken in two different instances of time, a person may be near the region 425 or 425b in one image and may not be present in another image. Because of the pixel values attributed to the pixels of the person in one of the images, the color map adjustment mask for those pixels will be higher than the threshold for those pixels. Accordingly, if equation 6 is not satisfied for one or more pixels, the color map adjustment mask is ignored for the one or more pixels, when performing the local color correction.

In some embodiments, after the generation of the color map adjustment mask for various pixels at or near a boundary of the region 425b, a difference image for various pixels at or near a boundary of the region 425b is generated as follows, where ∘ indicates the elementwise or Hadamard product:

$$D(p)=(S1(p)-S2(p))\circ M(p). \quad\quad \text{Equation 7.}$$

The difference image D(p) is generated for each of a plurality of pixels at or near the boundary of the regions 425, 425b, such as for pixels (P1a, P1b), pixels (P2a, P2b), pixels (P3a, P3b), pixels (P4a, P4b), and so on. For example, the difference image for pixels (P1a, P1b) may be: D(p1)=(S1(p1a)−S2(p1b))∘M(p1); the difference image for pixels (P2a, P2b) may be: D(p2) =(S1(p2a)−S2(p2b))∘M(p2), and so on.

Thus, the difference images D(p1), D(p2), and so on are generated for pixel pairs of the main image and the auxiliary image that are at or near the regions 425, 425b. Subsequently, the difference images D(p1), D(p2), and so on are used to perform local color correction of pixels inside the region 425b in the image 400b3. For example, in FIG. 4G, example pixels P10b, P11b, and P12b are inside the hole-region of the auxiliary image 400b3. The difference images D(p1), D(p2), and so on are used to do color correction for pixels P10b, P11b, and P12b inside the region 425b of the auxiliary image 400b3. In an example, diffusion interpolation is used to interpolate the difference images D(p1), D(p2), and so on of the pixels at or near the boundary of the region 425b to apply to pixels inside the region 425b in the auxiliary image 400b3. As examples, Donald Shepard's algorithm and/or a Poisson equation solver may be used to interpolate the difference images of pixels at the boundary of the region 425b to correct color of pixels inside the region 425b in the auxiliary image 400b3.

Although FIG. 3A illustrates the local photometric correction at 314 being performed subsequent to refining the geometric transformation at 312, in some other embodiments, the sequence of these two operations may be reversed. That is, the local photometric correction at 314 can be performed prior to refining the geometric transformation at 312. Because the local photometric correction better matches the color of the pixels at or near the hole-region, this may lead to better refinement of the geometric transformation.

Figure 4H:
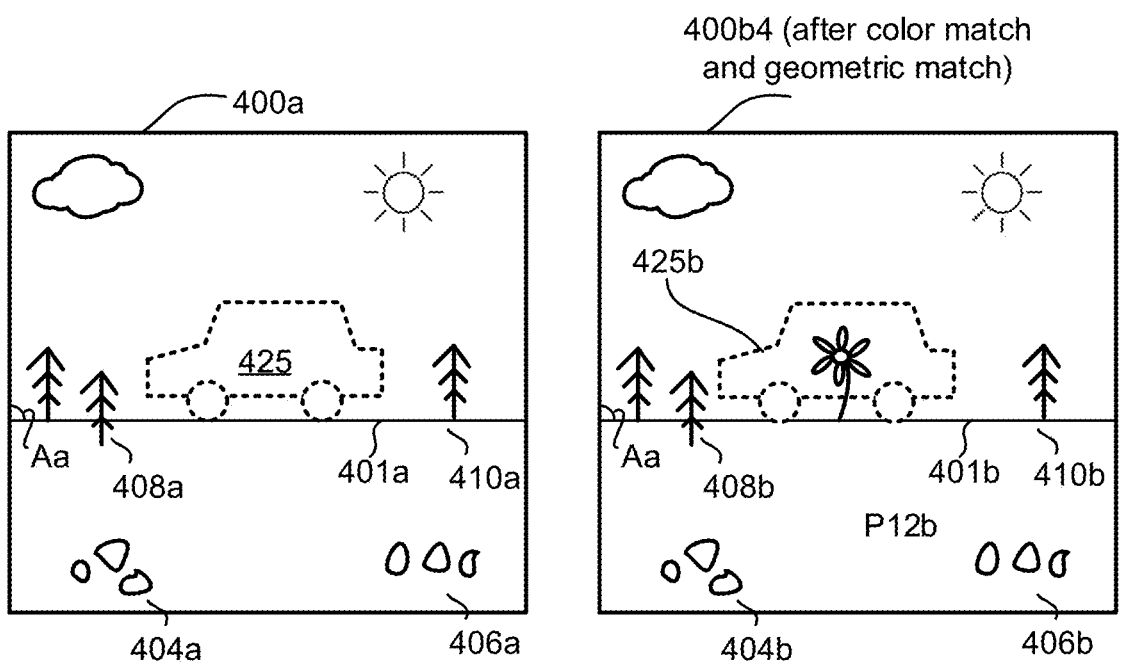

FIG. 4H illustrates the primary image 400a, and an auxiliary image 400b4 after the local color match. Thus, the auxiliary image 400b4 geometrically and photometrically matches the primary image 400a, within a given threshold. The primary image 400a has the hole-region 425 that has to be filled with the corresponding region 425a from the auxiliary image 400b4.

Referring again to FIG. 3A, at 316, the region 425b from the auxiliary image 400b4 is copied (e.g., by the hole-region filling module 110) to fill the hole-region 425 formed by removal of the selected object in the primary image. For example, as the auxiliary image 400b4 geometrically and photometrically sufficiently matches the primary image 400a, the image region 425b of the auxiliary image 400b4 can now be copied and pasted in the hole-region 425 of the primary image 400a.

To enable copy and paste, an initial guess image is generated to fill the hole-region 425 of the primary image 400a with the region 425b of the auxiliary image 400b4. The initial guess image is generated by applying the geometric transformation and global and local color matching, and copying from the region 425b of the auxiliary image 400b4 into the hole-region 425 to be removed in the primary image 400a. In some embodiments, a guide image is also generated similarly, where the guide image identifies the region 425b to be copied. The guide image is within the auxiliary image 400b4. A valid mask identifying the region to be copied is also generated. For example, the valid mask maps the hole-region 425 of the primary image 400a to the region 425b of the auxiliary image 400b4.

Figure 4I:
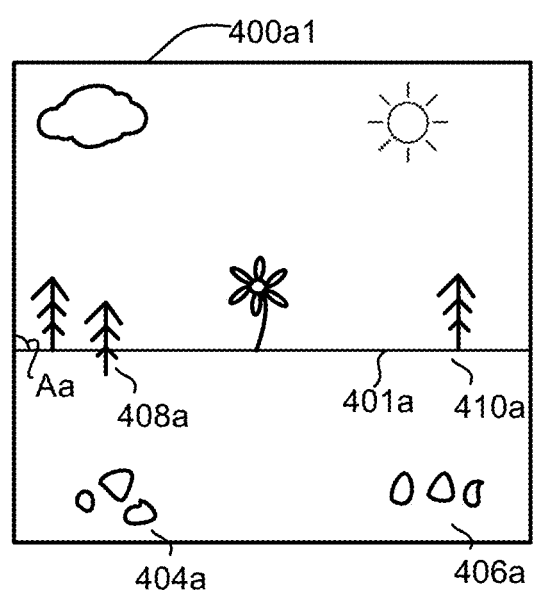

Referring again to FIG. 3A, at 320, the hole-region is filled with the copied contents from the region 425b of the auxiliary image 400b4. For example, FIG. 4I illustrates a modified primary image 400a1 generated from the primary image 400a by filling the hole-region 425 with contents from the region 425b of the auxiliary image 400b4. For example, the copied contents from the region 425b of the auxiliary image 400b4 are pasted in the foreground of the hole-region 425 to be removed. In an example, the contents from the region 425b of the auxiliary image 400b4 are overlaid on the foreground of the hole-region 425, such that the hole-region 425 is no longer visible in the primary image 400a. In another example, pixels of the hole-region 425 are replaced by pixels of the region 425b of the auxiliary image 400b4.

FIGS. 5A-5D illustrate example images, where an object from a primary image 500a is replaced by a background from an auxiliary image 500b, in accordance with some embodiments. FIG. 5A illustrates the primary image 500a, where a person is partially blocking a waterfall. The user may desire to remove the person from the scene of the primary image 500a. An auxiliary image 500b of FIG. 5B, which is a scaled version of the same scene as the primary image 500a, illustrates the waterfall without the person. FIG. 5C illustrates a hole-region 500c, in which an area of the primary image to be removed is depicted. FIG. 5D illustrates a modified primary image 500a1, in which the person of the primary image 500a is replaced by background copied from the auxiliary image, e.g., in accordance with the teachings of this disclosure (e.g., in accordance with the methods of FIGS. 3A, 3B).

In some embodiments, one or more modules of the system 102 can be implemented using corresponding one or more trained neural networks. For example, a network with convolutional or fully connected learned components can be used to implement a module of the system 102. The network is trained on training images comprising, for example, thousands or millions of images. In some embodiments, the trained network learns what the natural world looks like. In one such embodiment, the color of the region to be copied can be inferred by the network instead of, or in addition to, copying the color from the auxiliary image. Thus, the color of the region to be copied to the primary image need not be taken explicitly from the auxiliary image, in an example—plausible color transformations are drawn implicitly on the images on which network is trained. Similarly, plausible geometric transformations are drawn implicitly on the images on which network is trained. Thus, for example, one or more of the geometric transformation module 106 and/or the photometric transformation module 108 can be implemented using one or more trained neural networks.

Numerous variations and configurations will be apparent in light of this disclosure and the following examples.

Example 1. A method for performing image inpainting, the method comprising: receiving a selection of a first region of a primary image that is to be replaced with a corresponding second region from an auxiliary image; initially aligning the auxiliary image with the primary image by performing a geometric transformation of the primary and/or auxiliary image; further aligning one or more fine-scale features of the auxiliary image with one or more corresponding features of the primary image by refining the geometric transformation of the primary and/or auxiliary image, the one or more fine-scale features including an edge, a contour, a corner, and/or a deep feature; matching, within a given threshold, color of one or more pixels of the auxiliary image with color of corresponding one or more pixels of the primary image by performing a photometric transformation of the primary and/or auxiliary image; identifying a second region of the auxiliary image that corresponds to the first region of the primary image; and copying the second region of the auxiliary image to the first region of the primary image, subsequent to the geometric transformation and photometric transformation.

Example 2. The method of example 1, wherein performing the geometric transformation comprises applying an affine transformation model, a homography model, or a parameterized geometric transformation model between the primary and/or auxiliary images.

Example 3. The method of any of examples 1-2, wherein the geometric transformation comprises one or more of a rotation, uniform scaling, non-uniform scaling, translation, and/or distortion of the auxiliary image.

Example 4. The method of any of examples 1-3, further comprising: identifying a first plurality of features in the primary image and a second plurality of features in the auxiliary image; and identifying a plurality of pairs of matched features, each pair of matched features comprising (i) a feature from the first plurality of features of the primary image and (ii) a corresponding matching feature from the second plurality of features of the auxiliary image.

Example 5. The method of example 4, wherein performing the geometric transformation comprises: selecting a first one or more pairs of matched features of the plurality of pairs of matched features; performing a first geometric transformation of the auxiliary image, based on the selected first one or more pairs of matched features; and generating a first score based on information associated with one or more of the first one or more pairs of matched features, the plurality of pairs of matched features, the first geometric transformation, a distance of a pair of matched features of the first one or more pairs of matched features from the first region that is to be replaced, and/or information derived from the first one or of pairs of matched features.

Example 6. The method of example 5, wherein generating the first score comprises: dividing the primary image into a plurality of regions; and generating the first score based on (i) a number of pairs of matched features of the first one or more pairs of matched features that are included in each region of the plurality of regions, and (ii) the plurality of regions.

Example 7. The method of any of examples 5-6, wherein performing the geometric transformation comprises: in response to the first score failing to meet a threshold score, (i) selecting a second one or more pairs of matched features of the plurality of pairs of matched features, (ii) discarding the first geometric transformation of the auxiliary image, (iii) performing a second geometric transformation of the auxiliary image, based on the selected second one or more pairs of matched features, and (iv) generating a second score.

Example 8. The method of example 7, wherein performing the geometric transformation comprises: iteratively repeating (i) selecting a corresponding one or more pairs of matched features, (i) discarding a previous geometric transformation, (iii) performing a corresponding geometric transformation of the auxiliary image, and (iv) generating a corresponding score, until the score meets the threshold score and/or a number of repetitions meet a threshold number of iterations.

Example 9. The method of any of examples 4-8, wherein performing the photometric transformation comprises: determining one or more parameters, based on comparing colors of one or more features from the first plurality of features of the primary image with colors of corresponding one or more features from the second plurality of features of the auxiliary image; and performing the photometric transformation of the auxiliary image, based on the one or more parameters.

Example 10. The method of example 9, wherein the one or more parameters comprises: a first gain and a first bias associated with a red color channel; a second gain and a second bias associated with a green color channel; and a third gain and a third bias associated with a blue color channel.

Example 11. The method of any of examples 4-10, wherein refining the geometric transformation comprises: identifying a first pair of matched features comprising (i) a first feature from the first plurality of features of the primary image and (ii) a corresponding matching second feature from the second plurality of features of the auxiliary image, such that each of the first and second features have substantially straight edges; and increasing an alignment of an edge of the first feature with an edge of the second feature by refining the geometric transformation of the auxiliary image.

Example 12. The method of example 11, further comprising: while determining a refinement of the geometric transformation, penalizing refinement that results in the geometric transformation having a transformation property beyond a threshold value.

Example 12A. The method of any of examples 4-12, wherein one or more features of the first plurality of features in the primary image are sparse features.

Example 12B. The method of any of examples 4-12, wherein one or more features of the first plurality of features in the primary image are dense features.

Example 12C. The method of any of examples 4-12, wherein one or more features of the first plurality of features in the primary image are densely located at each pixel of the primary image.

Example 13. The method of any of examples 1-12, wherein the photometric transformation is a global photometric transformation such that the global photometric transformation is applied substantially throughout the primary image and/or the auxiliary image, and the method further comprises: performing a local photometric transformation of the auxiliary image that is limited to pixels that are on and/or within a threshold distance from the second region of the auxiliary image.

Example 14. The method of example 13, wherein performing the local photometric transformation comprises: comparing color information of first one or more pixels that are on or within the threshold distance from the second region of the auxiliary image with color information of second one or more pixels that are on or within the threshold distance from the first region of the primary image; generating a plurality of color map adjustment masks, based on the comparing; and performing the local photometric transformation, based on one or more of the plurality of color map adjustment masks.

Example 15. The method of example 14, wherein performing the local photometric transformation comprises: determining that a first color map adjustment mask of the plurality of color map adjustment masks is higher than a threshold value; and ignoring the first color map adjustment mask, while performing the local photometric transformation.

Example 16. The method of any of examples 14-15, wherein: the first one or more pixels and the second one or more pixels are blurred, prior to comparing the color information of the first one or more pixels with the color information of the second one or more pixels.

Example 17. The method of any of examples 1-16, wherein the photometric transformation of the primary and/or auxiliary image is performed after the geometric transformation of the auxiliary image.

Example 18. A system comprising: one or more processors; and an image fill system executable by the one or more processors to receive an identification of a first region of a primary image that is to be replaced with a corresponding region from an auxiliary image; match the auxiliary image with the primary image by transforming the auxiliary image; generate a guide image that identifies a second region of the auxiliary image that maps to the first region of the primary image; and overlay the second region of the auxiliary image over the first region of the primary image, subsequent to transforming the auxiliary image.

Example 19. The system of example 18, wherein the image fill system is executable to one or both of: geometrically match the auxiliary image with the primary image by geometrically transforming the auxiliary image, and/or photometrically match the auxiliary image with the primary image by photometrically transforming the auxiliary image.

Example 20. The system of example 19, wherein the geometric transformation of the auxiliary image comprises one or more of a rotation, uniform scaling, non-uniform scaling, translation, and/or distortion of the auxiliary image.

Example 21. The system of any of examples 19-20, wherein the image fill system is executable to: identify a first plurality of features in the primary image and a second plurality of features in the auxiliary image; and identify a plurality of pairs of matched features, each pair of matched features comprising (i) a feature from the first plurality of features of the primary image and (ii) a corresponding matching feature from the second plurality of features of the auxiliary image.

Example 22. The system of example 21, wherein the image fill system is executable to: select a first subset of the plurality of pairs of matched features; perform a first geometric transformation of the auxiliary image, based on the selected first subset of the plurality of pairs of matched features; and generate a first score based on the first subset of the plurality of pairs of matched features and the first geometric transformation.

Example 23. The system of example 22, wherein the image fill system is executable to: in response to the first score being less than a threshold, (i) select a second subset of the plurality of pairs of matched features, (ii) discard the first geometric transformation of the auxiliary image, and (iii) perform a second geometric transformation of the auxiliary image, based on the second subset of the plurality of pairs of matched features.

Example 24. The system of any of examples 22-23, wherein the image fill system is executable to: divide the primary image into a plurality of regions; and generate the first score such that the first score is based on a number of selected pairs of matched features that are included in individual regions of the plurality of regions.

Example 25. The system of any of examples 22-24, wherein the image fill system is executable to: generate the first score such that the first score is based on a distance of individual ones of the selected pairs of matched features from the first region that is to be replaced.

Example 26. The system of example 21, wherein the image fill system is executable to: determine one or more parameters, based on comparing colors of one or more features from the first plurality of features of the primary image with colors of corresponding one or more features from the second plurality of features of the auxiliary image; and perform the photometric transformation of the auxiliary image, based on the one or more parameters.

Example 27. The system of example 26, wherein the one or more parameters comprises: a first gain and a first bias associated with a red color channel; a second gain and a second bias associated with a green color channel; and a third gain and a third bias associated with a blue color channel.

Example 28. The system of any of examples 21-27, wherein the image fill system is executable to: refine the geometric transformation of the auxiliary image by identifying a first pair of matched features comprising (i) a first feature from the first plurality of features of the primary image and (ii) a corresponding matching second feature from the second plurality of features of the auxiliary image, such that each of the first and second features have substantially straight edges; and refining the geometric transformation of the auxiliary image by increasing an alignment of an edge of the first feature with an edge of the second feature.

Example 29. The system of any of examples 21-28, wherein the image fill system is executable to: while determining a refinement of the geometric transformation of the auxiliary image, penalize refinement that results in the geometric transformation having a transformation beyond a threshold value.

Example 30. The system of example 19-29, wherein: the transformation of the auxiliary image is a global photometric transformation of the auxiliary image such that the photometric transformation is applied substantially throughout the auxiliary image; and the image fill system is to perform a local photometric transformation of the auxiliary image that is limited to pixels that are on and/or within the second region of the auxiliary image.

Example 31. The system of any of examples 19-30, the image fill system is executable to: compare color information of first one or more pixels that are on or within a threshold distance from the second region of the auxiliary image with color information of second one or more pixels that are on or within a threshold distance from the first region of the primary image; generate a plurality of color map adjustment masks, based on the comparing; and perform the local photometric transformation, based on one or more of the plurality of color map adjustment masks.

Example 32. The system of example 31, the image fill system is executable to: determine at a first color map adjustment mask of the plurality of color map adjustment masks is higher than a threshold value; and ignore the first color map adjustment mask, while performing the local photometric transformation.

Example 33. The system of example 31, wherein: the first one or more pixels and the second one or more pixels are blurred, prior to comparison of the color information of the first one or more pixels with the color information of the second one or more pixels.

Example 34. A computer program product including one or more non-transitory machine-readable mediums encoded with instructions that when executed by one or more processors cause a process to be carried out for deforming an image, the process comprising: receiving an identification of an object in a primary image that is to be removed from the primary image and replaced with a background region from an auxiliary image; geometrically aligning the auxiliary image with the primary image by (i) randomly selecting first one or more features of the primary image and a corresponding matching second one or more features of the auxiliary image, (ii) performing a geometric transformation of the auxiliary image, based on the first one or more features of the primary image and the second one or more features of the auxiliary image, (iii) generating a score based on (a) the first one or more features, (b) the second one or more features, and (c) the first geometric transformation, and (iv) iteratively repeating operations (i), (ii), and (iii), until the generated score meets a threshold score requirement and/or a number of repetitions meet a threshold number of iterations; and overlaying the background region of the auxiliary image over the object in the primary image.

Example 35. The computer program product of example 34, wherein the geometric transformation of the auxiliary image comprises an affine transformation of the auxiliary image and/or a homographic transformation of the auxiliary image.

Example 36. The computer program product of any of examples 34-35, the process further comprising: matching color of a plurality of pixels of the auxiliary image with a corresponding plurality of pixels of the primary image, by transforming color of the plurality of pixels of the auxiliary image.

Example 37. The computer program product of example 35, wherein transforming color of the plurality of pixels of the auxiliary image comprises: performing a global color correction by transforming color of pixels throughout the auxiliary image.

Example 38. The computer program product of example 36, wherein transforming color of the plurality of pixels of the auxiliary image comprises: performing a local color correction by transforming color of pixels within the background region of the auxiliary image that is to be overlaid over the object in the primary image.

Example 39. A server comprising the computer program product of any of examples 34-38.

Example 40. A client-server system comprising the computer program product of any of examples 34-39.

The foregoing detailed description has been presented for illustration. It is not intended to be exhaustive or to limit the disclosure to the precise form described. Many modifications and variations are possible in light of this disclosure. Therefore, it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for performing image inpainting, the method comprising:
    receiving a selection of a first region of a primary image that is to be replaced with a corresponding second region from an auxiliary image;
    initially aligning the auxiliary image with the primary image by performing a geometric transformation of the primary and/or auxiliary image;
    further aligning one or more fine-scale features of the auxiliary image with one or more corresponding features of the primary image by refining the geometric transformation of the primary and/or auxiliary image, the one or more fine-scale features including an edge, a contour, a corner, and/or a deep feature;
    matching, within a given threshold, color of one or more pixels of the auxiliary image with color of corresponding one or more pixels of the primary image by performing a photometric transformation of the primary and/or auxiliary image;
    identifying the second region of the auxiliary image that corresponds to the first region of the primary image; and copying the second region of the auxiliary image to the first region of the primary image, subsequent to the geometric transformation and the photometric transformation;

wherein the photometric transformation is a global photometric transformation that is applied throughout the primary image and/or the auxiliary image;

wherein the method further comprises performing a local photometric transformation of the auxiliary image that is limited to pixels that are on and/or within a threshold distance from the second region of the auxiliary image; and wherein performing the local photometric transformation comprises comparing color information of first one or more pixels that are on or within the threshold distance from the second region of the auxiliary image with color information of second one or more pixels that are on or within the threshold distance from the first region of the primary image, generating a plurality of color map adjustment masks, based on the comparing, and performing the local photometric transformation, based on one or more of the plurality of color map adjustment masks.

2. The method of claim 1, wherein performing the geometric transformation comprises applying an affine transformation model, a homography model, or a parameterized geometric transformation model between the primary and/or auxiliary images.

3. The method of claim 1, wherein the geometric transformation comprises one or more of a rotation, uniform scaling, non-uniform scaling, translation, and/or distortion of the auxiliary image.

4. The method of claim 1, further comprising:
identifying a first plurality of features in the primary image and a second plurality of features in the auxiliary image; and
identifying a plurality of pairs of matched features, each pair of matched features comprising (i) a feature from the first plurality of features of the primary image and (ii) a corresponding matching feature from the second plurality of features of the auxiliary image.

5. The method of claim 4, wherein performing the geometric transformation comprises:
selecting a first one or more pairs of matched features of the plurality of pairs of matched features;
performing a first geometric transformation of the auxiliary image, based on the selected first one or more pairs of matched features; and
generating a first score based on information associated with one or more of the first one or more pairs of matched features, the plurality of pairs of matched features, the first geometric transformation, a distance of a pair of matched features of the first one or more pairs of matched features from the first region that is to be replaced, and/or information derived from the first one or more of pairs of matched features.

6. The method of claim 5, wherein generating the first score comprises:
dividing the primary image into a plurality of regions; and
generating the first score based on (i) a number of pairs of matched features of the first one or more pairs of matched features that are included in each region of the plurality of regions, and (ii) the plurality of regions.

7. The method of claim 5, wherein performing the geometric transformation comprises: in response to the first score failing to meet a threshold score, (i) selecting a second one or more pairs of matched features of the plurality of pairs of matched features, (ii) discarding the first geometric transformation of the auxiliary image, (iii) performing a second geometric transformation of the auxiliary image, based on the selected second one or more pairs of matched features, and (iv) generating a second score.

8. The method of claim 7, wherein performing the geometric transformation comprises: iteratively repeating (i) selecting a corresponding one or more pairs of matched features, (ii) discarding a previous geometric transformation, (iii) performing a corresponding geometric transformation of the auxiliary image, and (iv) generating a corresponding score, until the corresponding score meets the threshold score and/or a number of repetitions meet a threshold number of iterations.

9. The method of claim 4, wherein refining the geometric transformation comprises:
identifying a first pair of matched features comprising (i) a first feature from the first plurality of features of the primary image and (ii) a corresponding matching second feature from the second plurality of features of the auxiliary image, such that each of the first and second features have straight edges; and
increasing an alignment of an edge of the first feature with an edge of the second feature by refining the geometric transformation of the auxiliary image.

10. The method of claim 9, further comprising: while determining a refinement of the geometric transformation, penalizing refinement that results in the geometric transformation having a transformation property beyond a threshold value.

11. The method of claim 1, wherein performing the local photometric transformation comprises:
determining that a first color map adjustment mask of the plurality of color map adjustment masks is higher than a threshold value; and
ignoring the first color map adjustment mask, while performing the local photometric transformation.

12. The method of claim 1, wherein: the first one or more pixels and the second one or more pixels are blurred, prior to comparing the color information of the first one or more pixels with the color information of the second one or more pixels.

13. A method for performing image inpainting, the method comprising:
receiving a selection of a first region of a primary image that is to be replaced with a corresponding second region from an auxiliary image;
identifying a first plurality of features in the primary image and a second plurality of features in the auxiliary image;
identifying a plurality of pairs of matched features, each pair of matched features comprising (i) a feature from the first plurality of features of the primary image and (ii) a corresponding matching feature from the second plurality of features of the auxiliary image;
selecting a first one or more pairs of matched features of the plurality of pairs of matched features;
performing a first geometric transformation of the auxiliary image, based on the selected first one or more pairs of matched features;
generating a first score based on information associated with one or more of the first one or more pairs of matched features, the plurality of pairs of matched features, the first geometric transformation, a distance of a pair of matched features of the first one or more pairs of matched features from the first region that is to be replaced, and/or information derived from the first one or more of pairs of matched features;

in response to the first score failing to meet a threshold score, (i) selecting a second one or more pairs of matched features of the plurality of pairs of matched features, (ii) discarding the first geometric transformation of the auxiliary image, and (iii) performing a second geometric transformation of the auxiliary image, based on the selected second one or more pairs of matched features, wherein the selected second one or more pairs of matched features includes an edge, a contour, a corner, and/or a deep feature;

matching, within a given threshold, color of one or more pixels of the auxiliary image with color of corresponding one or more pixels of the primary image by performing a photometric transformation of the primary and/or auxiliary image;

identifying the second region of the auxiliary image that corresponds to the first region of the primary image; and copying the second region of the auxiliary image to the first region of the primary image, subsequent to the second geometric transformation and photometric transformation.

14. The method of claim 13, wherein the photometric transformation is a global photometric transformation such that the global photometric transformation is applied substantially throughout the primary image and/or the auxiliary image, and the method further comprises performing a local photometric transformation of the auxiliary image that is limited to pixels that are on and/or within a threshold distance from the second region of the auxiliary image.

15. The method of claim 14, wherein performing the local photometric transformation comprises:

comparing color information of first one or more pixels that are on or within the threshold distance from the second region of the auxiliary image with color information of second one or more pixels that are on or within the threshold distance from the first region of the primary image;

generating a plurality of color map adjustment masks, based on the comparing; and performing the local photometric transformation, based on one or more of the plurality of color map adjustment masks.

16. The method of claim 15, wherein performing the local photometric transformation comprises:

determining that a first color map adjustment mask of the plurality of color map adjustment masks is higher than a threshold value; and ignoring the first color map adjustment mask, while performing the local photometric transformation.

17. The method of claim 15, wherein the first one or more pixels and the second one or more pixels are blurred, prior to comparing the color information of the first one or more pixels with the color information of the second one or more pixels.

18. A computer program product including one or more non-transitory machine-readable mediums encoded with instructions that when executed by one or more processors cause a process to be carried out for deforming an image, the process comprising:

receiving a selection of a first region of a primary image that is to be replaced with a corresponding second region from an auxiliary image;

initially aligning the auxiliary image with the primary image by performing a geometric transformation of the primary and/or auxiliary image;

further aligning one or more fine-scale features of the auxiliary image with one or more corresponding features of the primary image by refining the geometric transformation of the primary and/or auxiliary image, the one or more fine-scale features including an edge, a contour, a corner, and/or a deep feature;

matching, within a given threshold, color of one or more pixels of the auxiliary image with color of corresponding one or more pixels of the primary image by performing a photometric transformation of the primary and/or auxiliary image;

identifying the second region of the auxiliary image that corresponds to the first region of the primary image; and copying the second region of the auxiliary image to the first region of the primary image, subsequent to the geometric transformation and the photometric transformation;

wherein the photometric transformation is a global photometric transformation that is applied throughout the primary image and/or the auxiliary image;

wherein the method further comprises performing a local photometric transformation of the auxiliary image that is limited to pixels that are on and/or within a threshold distance from the second region of the auxiliary image; and wherein performing the local photometric transformation comprises comparing color information of first one or more pixels that are on or within the threshold distance from the second region of the auxiliary image with color information of second one or more pixels that are on or within the threshold distance from the first region of the primary image, generating a plurality of color map adjustment masks, based on the comparing, and performing the local photometric transformation, based on one or more of the plurality of color map adjustment masks.

19. The computer program product of claim 18, wherein the geometric transformation comprises one or more of a rotation, uniform scaling, non- uniform scaling, translation, and/or distortion of the auxiliary image.

20. The computer program product of claim 18, wherein the first one or more pixels and the second one or more pixels are blurred, prior to comparing the color information of the first one or more pixels with the color information of the second one or more pixels.

* * * * *